United States Patent
Kowalchuk et al.

(10) Patent No.: US 12,102,030 B2
(45) Date of Patent: Oct. 1, 2024

(54) SEEDER ROW UNIT HAVING A CLOSING SYSTEM

(71) Applicant: CNH Industrial Canada, Ltd., Saskatoon (CA)

(72) Inventors: Trevor Lawrence Kowalchuk, Saskatoon (CA); Dennis George Thompson, Saskatoon (CA)

(73) Assignee: CNH Industrial Canada, Ltd. (CA)

( * ) Notice: Subject to any disclaimer, the term of this patent is extended or adjusted under 35 U.S.C. 154(b) by 736 days.

(21) Appl. No.: 17/360,325

(22) Filed: Jun. 28, 2021

(65) Prior Publication Data

US 2022/0000010 A1 Jan. 6, 2022

Related U.S. Application Data

(60) Provisional application No. 63/047,025, filed on Jul. 1, 2020.

(51) Int. Cl.
*A01C 5/06* (2006.01)
*A01B 63/00* (2006.01)

(52) U.S. Cl.
CPC ............ *A01C 5/068* (2013.01); *A01B 63/008* (2013.01)

(58) Field of Classification Search
CPC ....... A01C 5/066; A01C 5/068; A01B 63/002; A01B 63/008
See application file for complete search history.

(56) References Cited

U.S. PATENT DOCUMENTS

| | | |
|---|---|---|
| 4,191,262 A | 3/1980 | Sylvester |
| 5,497,717 A | 3/1996 | Martin |
| 5,685,246 A | 11/1997 | Zimmerman |
| 6,144,910 A | 11/2000 | Scarlett et al. |
| 6,216,616 B1 | 4/2001 | Bourgault |
| 6,345,671 B1 | 2/2002 | Siemens et al. |
| 6,530,334 B2 | 3/2003 | Hagny |

(Continued)

FOREIGN PATENT DOCUMENTS

| | | |
|---|---|---|
| WO | WO2017087284 | 5/2017 |
| WO | WO2017112446 | 6/2017 |
| WO | WO2018075788 | 4/2018 |

OTHER PUBLICATIONS

Eckelkamp, "Closing in on the Seed", Agweb, Feb. 7, 2011, https://www.agweb.com/news/crops/crop-production-news/crops/farm-journal-test-plots/closing-seed.

(Continued)

*Primary Examiner* — Tara Mayo
(74) *Attorney, Agent, or Firm* — Rebecca Henkel; Rickard K. DeMille; Peter K. Zacharias

(57) ABSTRACT

A row unit of a seeder includes a frame configured to be coupled to a toolbar of the seeder. The row unit also includes a single opener disc rotatably coupled to the frame and a closing system. The closing system includes a closing disc arm pivotally coupled to the frame, and a closing disc rotatably coupled to the closing disc arm. The closing system also includes a closing disc actuator coupled to the closing disc arm. Furthermore, the closing system includes a packer wheel arm pivotally coupled to the frame. The packer wheel arm and the closing disc arm are configured to rotate independently of one another relative to the frame. The closing system also includes a packer wheel rotatably coupled to the packer wheel arm. Furthermore, the closing system includes a packer wheel actuator coupled to the frame and to the packer wheel arm.

20 Claims, 5 Drawing Sheets

(56) References Cited

U.S. PATENT DOCUMENTS

| | | |
|---|---|---|
| 6,701,857 B1 | 3/2004 | Jensen et al. |
| 7,191,715 B2 | 3/2007 | Wendte et al. |
| 7,581,503 B2 | 9/2009 | Martin et al. |
| 7,866,269 B2 | 1/2011 | Naylor et al. |
| 7,938,074 B2 | 5/2011 | Liu |
| 7,980,186 B2 | 7/2011 | Henry |
| 8,103,417 B2 | 1/2012 | Gharsalli et al. |
| 8,267,021 B2 | 9/2012 | Mariman et al. |
| 8,275,525 B2 | 9/2012 | Kowalchuk et al. |
| 8,342,258 B2 | 1/2013 | Ryder et al. |
| 8,356,564 B2 | 1/2013 | Breker et al. |
| 8,522,889 B2 | 9/2013 | Adams et al. |
| 8,910,582 B2 | 12/2014 | Mariman et al. |
| 9,148,989 B2 | 10/2015 | Van Buskirk et al. |
| 9,179,593 B2 | 11/2015 | Anderson et al. |
| 9,357,692 B2 | 6/2016 | Johnson et al. |
| 9,497,900 B2 | 11/2016 | Nelson et al. |
| 9,582,002 B2 | 2/2017 | Cavender-Bares |
| 9,706,703 B2 | 7/2017 | Anderson et al. |
| 9,814,172 B2 | 11/2017 | Achen et al. |
| 9,848,523 B2 | 12/2017 | Sauder et al. |
| 9,872,425 B2 | 1/2018 | Anderson et al. |
| 9,930,826 B2 | 4/2018 | McCloskey |
| 9,943,030 B2 | 4/2018 | Sheppard |
| 10,006,994 B2 | 6/2018 | Chan et al. |
| 10,060,467 B2 | 8/2018 | Schaffert et al. |
| 10,143,128 B2 | 12/2018 | Landphair et al. |
| 10,149,424 B2 | 12/2018 | Maust et al. |
| 10,178,823 B2 | 1/2019 | Kovach et al. |
| 10,231,376 B1 | 3/2019 | Stanhope et al. |
| 10,257,974 B1 | 4/2019 | Schoeny et al. |
| 10,299,424 B2 | 5/2019 | Hamilton |
| 10,308,116 B2 | 6/2019 | Czapka et al. |
| 2016/0100517 A1 | 4/2016 | Bassett |
| 2017/0359940 A1 | 12/2017 | Bassett |
| 2018/0317376 A1 | 11/2018 | Gebbeken et al. |
| 2019/0033895 A1 | 1/2019 | Thompson et al. |
| 2019/0124824 A1 | 5/2019 | Hubner et al. |
| 2022/0000014 A1 | 1/2022 | Kowalchuk et al. |
| 2022/0000015 A1 | 1/2022 | Kowalchuk et al. |

OTHER PUBLICATIONS

Taylor, "Case Planter Gives Seed a Head Start", The Weekly Times, Nov. 28, 2018, 2 pgs, News Limited, Melbourne, Vic., http://dialog.proquest.com/professional/docview/2138085294?accountid=157282.

"Seed Hawk Gives Big Working Opportunities with Narrow Transport Widths", Southern Weekly, Feb. 2, 2014, 2 pgs, Fairfax Media Publications Pty Limited, Australia, http://dialog.proquest.com/professional/docview/1493849510?accountid=157282.

Concord Seeding Equipment Full Line 2020, Concord, Jun. 2019, https://concordseeding.com/media/1536/concord_full-line_brochure_060519-1_web.pdf.

Nutri-Placer 930 & 940, Pull-Type $NH_3$ Applicators, Case IH Agriculture, 2018, 16 pgs.

Screen capture from YouTube video clip entitled "ProSeries™ Opener Animation Video | John Deere Air Seeding Equipment", uploaded on Aug. 23, 2018 by John Deere. Retrieved from Internet: https://youtu.be/CF1NEeZe77I.

Amity Seeding Equipment, Oct. 2017, 24 pgs.

Amity Technology, Single Disc Drill, Aug. 2016, 7 pgs.

Concord, Air Seeders, Precision Shank Drill, Jul. 2019, 2 pgs.

Screen capture from YouTube video clip entitled "How to Adjust the Depth Setting on Seed Hawk Openers", uploaded on Mar. 18, 2016 by Vaderstad Canada. Retrieved from Internet: https://www.youtube.com/watch?v=qEZhHL701Ds.

Screen capture from YouTube video clip entitled "SeedMaster 2013 ", uploaded on Aug. 16, 2013 by SeedMaster. Retrieved from Internet: https://www.youtube.com/watch?v=gi6z3KoEDjo.

Screen capture from YouTube video clip entitled "TruSet on the John Deere P500", uploaded on Aug. 24, 2016 by John Deere. Retrieved from Internet: https://www.youtube.com/watch?v=CaLw37jtIKE.

Screen capture from YouTube video clip entitled "Get to Know the Yetter 10,000 Mangnum™ Opener for Fertilizer Application", uploaded on Aug. 8, 2017 by Yetter Farm Equipment. Retrieved from Internet: https://www.youtube.com/watch?v=0Wqo3kx5Kgk.

Screen capture from YouTube video clip entitled "RCX Hydraulic Closing System", uploaded on Jun. 28, 2019 by Dawn Equipment. Retrieved from Internet: https://www.youtube.com/watch?v=oNrFWQWWRas.

Screen capture from YouTube video clip entitled "Precision Planting FurrowForce", uploaded on Jan. 29, 2019 by Future Farming. Retrieved from Internet: https://www.youtube.com/watch?v=r4REyHYwffU.

Screen capture from YouTube video clip entitled "Case IH Precision Disk 500T Disk Drill Animation", uploaded on Jun. 9, 2014 by Case IH North America. Retrieved from Internet: https://www.youtube.com/watch?v=-_4k3RGoY5o.

Screen capture from YouTube video clip entitled "Introducing the 2000 Series Early Riser Planter", uploaded on Nov. 23, 2015 by Case IH North America. Retrieved from Internet: https://www.youtube.com/watch?v=u8LBWKnkl-s.

SEEDER ROW UNIT HAVING A CLOSING SYSTEM

CROSS-REFERENCE TO RELATED APPLICATION

This application claims priority from and the benefit of U.S. Provisional Application Ser. No. 63/047,025, entitled "Seeder Row Unit Having a Closing System", filed Jul. 1, 2020, which is hereby incorporated by reference in its entirety.

BACKGROUND

The present disclosure relates generally to a seeder row unit having a closing system.

Generally, agricultural seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., positioned adjacent to the opener) is configured to deposit seeds into the trench. The opener/seed tube may be followed by a packer wheel that packs the soil on top of the deposited seeds. Unfortunately, while the row unit is operating within fields having certain soil types and/or certain soil conditions, the packer wheel may not effectively close the trench and/or break up the side walls of the trench. Accordingly, the resultant yield performance from the deposited seeds may be reduced.

BRIEF DESCRIPTION

In certain embodiments, a row unit of a seeder includes a frame configured to be coupled to a toolbar of the seeder. In addition, the row unit includes a single opener disc rotatably coupled to the frame and a closing system. The closing system includes a closing disc arm pivotally coupled to the frame, and a closing disc rotatably coupled to the closing disc arm. The closing disc arm positions a rotational axis of the closing disc rearward of a rotational axis of the single opener disc relative to a direction of travel of the row unit. The closing system also includes a closing disc actuator coupled to the closing disc arm. The closing disc actuator is configured to control a first downforce applied by the closing disc to soil. In addition, the closing system includes a packer wheel arm pivotally coupled to the frame. The packer wheel arm and the closing disc arm are configured to rotate independently of one another relative to the frame. Furthermore, the closing system includes a packer wheel rotatably coupled to the packer wheel arm. The packer wheel arm positions a rotational axis of the packer wheel rearward of the rotational axis of the closing disc relative to the direction of travel of the row unit. The closing system also includes a packer wheel actuator coupled to the frame and to the packer wheel arm. The packer wheel actuator is configured to control a second downforce applied by the packer wheel to the soil, and an agricultural product storage compartment is not non-movably coupled to the frame.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
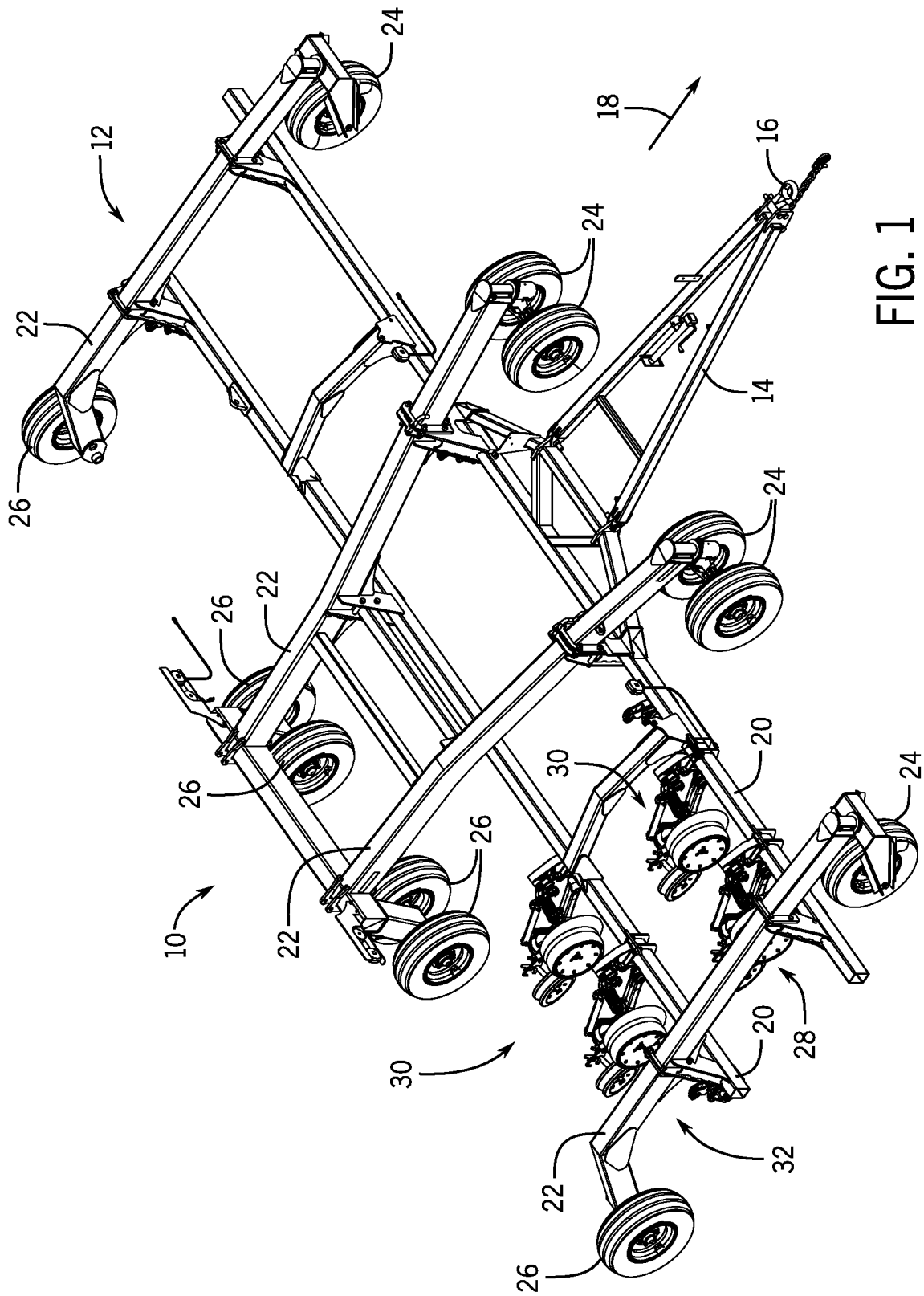
FIG. 1 is a perspective view of an embodiment of an agricultural seeding implement having multiple row units.

FIG. 1 is a perspective view of an embodiment of an agricultural seeding implement 10 (e.g., seeder) having multiple row units. As illustrated, the agricultural seeding implement 10 includes a frame 12 and a tow bar 14 coupled to the frame 12. In the illustrated embodiment, the tow bar 14 is pivotally coupled to the frame 12 and includes a hitch 16. The hitch 16 is configured to interface with a corresponding hitch of a work vehicle (e.g., tractor, etc.), thereby enabling the work vehicle to tow the agricultural seeding implement 10 through a field along a direction of travel 18. While the illustrated tow bar 14 forms an A-frame, in certain embodiments, the tow bar may have any other suitable configuration (e.g., a single bar extending along the direction of travel, etc.). In addition, while the tow bar 14 is pivotally coupled to the frame 12 in the illustrated embodiment, in certain embodiments, the tow bar may be rigidly coupled to the frame. Furthermore, in certain embodiments, the hitch 16 may be coupled to a corresponding hitch of another implement (e.g., an air cart, etc.), and the other implement may be coupled to the work vehicle (e.g., via respective hitches). While the agricultural seeding implement 10 is configured to be towed through the field by a work vehicle in the illustrated embodiment, in certain embodiments, the agricultural seeding implement may be part of a self-propelled vehicle (e.g., in which the frame of the agricultural seeding implement is coupled to a main frame/chassis of the self-propelled vehicle).

In the illustrated embodiment, the frame 12 of the agricultural seeding implement 10 includes two toolbars 20 and four supports 22. As illustrated, wheels are coupled to the supports 22, and the supports 22 are coupled to the toolbars 20 (e.g., via fasteners, via a welded connection, etc.). In the illustrated embodiment, front wheel(s) 24 are rotatably coupled to a respective front portion of each support 22, and rear wheel(s) 26 are rotatably coupled to a respective rear portion of each support 22. The front portion of each support 22 is positioned forward of the respective rear portion relative to the direction of travel 18. The wheels maintain the supports 22 above the surface of the field and enable the agricultural seeding implement 10 to move along the direction of travel 18. In the illustrated embodiment, pivotal connections between the front wheels 24 and the respective supports 22 enable the front wheels 24 to caster, thereby enhancing the turning ability of the agricultural seeding implement 10 (e.g., at a headland, during transport, etc.). However, in certain embodiments, at least one front wheel may be non-pivotally coupled to the respective support, and/or at least one rear wheel may be pivotally coupled to the respective support. While the frame 12 of the agricultural seeding implement 10 has four supports 22 in the illustrated embodiment, in certain embodiments, the agricultural seeding implement may have more or fewer supports (e.g., 0, 1, 2, 3, 4, 5, 6, or more). Furthermore, in certain embodiments, the toolbars 20 of the frame 12 may be supported by other and/or additional suitable structures (e.g., connectors extending between toolbars, wheel mounts coupled to toolbars, etc.).

In the illustrated embodiment, a first row 28 of row units 30 is coupled to the front toolbar 20, and a second row 32 of row units 30 is coupled to the rear toolbar 20. While the agricultural seeding implement 10 has two toolbars 20 and two corresponding rows of row units 30 in the illustrated embodiment, in other embodiments, the agricultural seeding implement may include more or fewer toolbars (e.g., 1, 2, 3, 4, 5, 6, or more) and a corresponding number of rows of row units. Furthermore, while the agricultural seeding implement 10 includes one type of row unit in the illustrated embodiment, in other embodiments, the agricultural seeding implement may include multiple types of row units and/or other suitable agricultural tools (e.g., spray nozzle(s), finishing reel(s), tillage shank(s), etc.). In addition, while the row units are directly coupled to the toolbars in the illustrated embodiment, in other embodiments, at least a portion of the row units may be coupled to one or more sub-frames/sub-bars, which are movably (e.g., rotatably and/or translatably) coupled to the toolbar(s). For example, one or more groups of row units (e.g., gang(s) of row units) may be coupled to one or more respective sub-frames/sub-bars that are movably coupled to respective toolbar(s).

In the illustrated embodiment, each row unit 30 of the agricultural seeding implement 10 is configured to deposit agricultural product (e.g., seed, fertilizer, etc.) into the soil. For example, certain row units 30 (e.g., all of the row units 30 of the agricultural seeding implement 10, a portion of the row units 30 of the agricultural seeding implement 10, at least one row unit 30 of the agricultural seeding implement 10, etc.) include an opener disc configured to form a trench within the soil for agricultural product deposition into the soil. The row unit 30 also includes a gauge wheel (e.g., positioned adjacent to the opener disc) configured to control a penetration depth of the opener disc into the soil. For example, the opener disc may be rotatably and non-movably coupled to a frame of the row unit, and the gauge wheel may be movably coupled to the frame and configured to contact a surface of the soil during operation of the row unit. Accordingly, adjusting the vertical position of the gauge wheel relative to the frame of the row unit controls the penetration depth of the opener disc into the soil. In addition, the row unit includes a product tube (e.g., seed tube) configured to deposit the agricultural product into the trench formed by the opener disc.

The opener disc/agricultural product tube is followed by a closing system. The closing system includes a closing assembly having at least one closing disc configured to close the trench formed by the opener disc and/or to break up the side wall(s) of the trench. The closing system also includes a packer assembly that follows the closing assembly. The packer assembly includes a packer wheel configured to pack soil on top of the deposited agricultural product. In certain embodiments, each row unit 30 of the second row 32 is laterally offset (e.g., offset in a direction perpendicular to the direction of travel 18) from a respective row unit 30 of the first row 28, such that two adjacent rows of agricultural product are established within the soil. While the illustrated agricultural seeding implement 10 includes two row units 30 in the first row 28 and two row units 30 in the second row 32 for illustrative purposes, the agricultural seeding implement may have any suitable number of row units in the first row and any suitable number of row units in the second row. For example, the agricultural seeding implement may include 5, 10, 15, 20, 25, or 30 row units in the first row and a corresponding number of row units in the second row. Furthermore, in certain embodiments, the second row may include more or fewer row units than the first row.

In certain embodiments, the agricultural seeding implement and/or at least one row unit of the agricultural seeding implement includes a downforce actuator configured to control a downforce applied by the row unit gauge wheel to the soil surface. For example, in certain embodiments, the agricultural seeding implement may include multiple downforce actuators each configured to control the downforce applied by the gauge wheels of a group of row units (e.g., on a sub-frame/sub-bar) coupled to the downforce actuator. The downforce actuator may enable the downforce applied by the respective gauge wheel(s) to the soil surface to be adjusted based on soil condition(s), soil type, agricultural product type (e.g., seed type, fertilizer type, etc.), other suitable parameter(s), or a combination thereof. For example, the downforce may be reduced for moist soil conditions to reduce compaction, and the downforce may be increased for harder soil to enable the gauge wheel(s) to maintain contact with the soil surface.

As previously discussed, each row unit 30 includes a closing system having a closing assembly and a packer assembly. The closing assembly includes a closing disc arm pivotally coupled to the frame of the row unit. The closing assembly also includes at least one closing disc rotatably coupled to the closing disc arm. The closing disc arm positions a rotational axis of the at least one closing disc rearward of a rotational axis of the opener disc relative to the direction of travel 18. In addition, the closing assembly includes a closing disc actuator coupled to the frame and to the closing disc arm. The closing disc actuator is configured to control a downforce applied by the closing disc to the soil. Furthermore, the packer assembly includes a packer wheel arm pivotally coupled to the frame. The packer wheel arm and the closing disc arm are configured to rotate independently of one another relative to the frame. The packer assembly also includes a packer wheel rotatably coupled to the packer wheel arm. The packer wheel arm positions a rotational axis of the packer wheel rearward of the rotational axis of the at least one closing disc relative to the direction of travel. In addition, the packer assembly includes a packer wheel actuator coupled to the frame and to the packer wheel arm. The packer wheel actuator is configured to control a downforce applied by the packer wheel to the soil. Because the packer wheel arm and the closing disc arm are configured to rotate independently of one another relative to the frame, the closing disc actuator may control the contact force between the closing disc(s) and the soil substantially independently of the contact force between the packer wheel and the soil, and the packer wheel actuator may control the contact force between the packer wheel and the soil substantially independently of the contact force between the closing disc(s) and the soil. For example, each contact force may be adjusted for particular field conditions (e.g., soil composition, soil moisture, etc.). As a result, the closing system disclosed herein may be utilized to effectively close the trench and/or break up the side wall(s) of the trench for a variety of field conditions.

Figure 2:
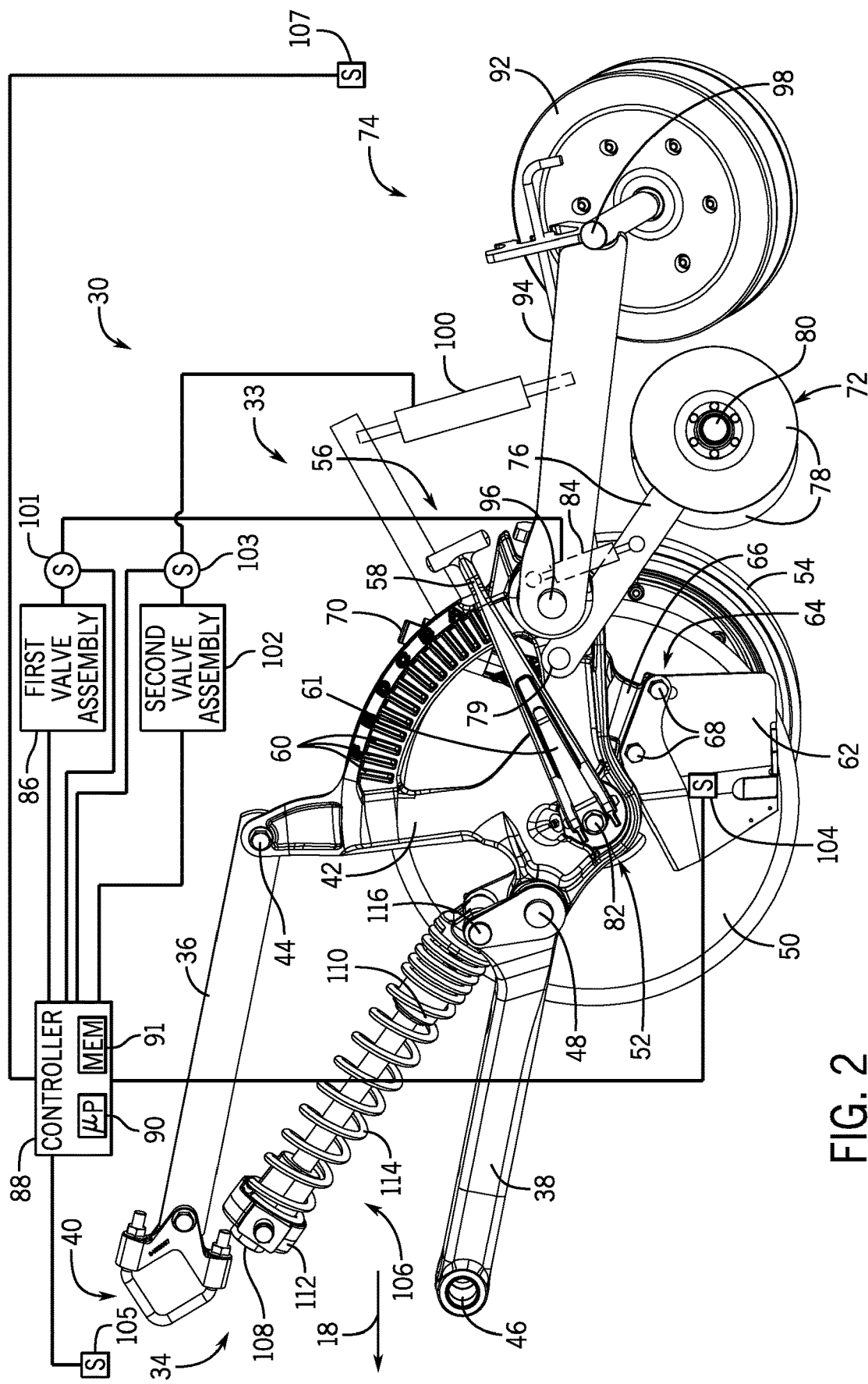
FIG. 2 is a side view of an embodiment of a row unit that may be employed within the agricultural seeding implement of FIG. 1, in which the row unit has an embodiment of a closing system.

FIG. 2 is a perspective view of an embodiment of a row unit 30 (e.g., agricultural row unit, seeder row unit) that may be employed within the agricultural seeding implement of FIG. 1, in which the row unit has an embodiment of a closing system 33. In the illustrated embodiment, the row unit 30 includes a linkage assembly 34 configured to couple (e.g., movably couple) the row unit 30 to a respective toolbar of the agricultural seeding implement. The linkage assembly 34 includes an upper link 36 and a lower link 38. A mount 40 is positioned at a first end of the upper link 36 and is configured to couple to the respective toolbar of the agricultural seeding implement. In addition, a second end of the upper link 36 is coupled to a frame 42 of the row unit 30 by a fastener 44. The lower link 38 includes an opening 46 configured to receive a fastener that rotatably couples the lower link 38 to the respective toolbar (e.g., via a rockshaft that is rotatably coupled to the respective toolbar). In addition, a second end of the lower link 38 is coupled to the frame 42 of the row unit by a fastener 48. The linkage assembly 34 enables the frame 42 of the row unit 30 to move vertically (e.g., raise and lower) relative to the respective toolbar (e.g., in response to the opener disc/gauge wheel contacting an obstruction, in response to variations in the terrain, for raising the row unit frame for transport, etc.). While the row unit 30 includes the linkage assembly 34 having the upper link 36 and the lower link 38 in the illustrated embodiment, in other embodiments, the row unit may include any other suitable linkage configuration to facilitate vertical movement of the row unit frame relative to the respective toolbar. Furthermore, in certain embodiments, the row unit frame may be non-movably coupled to the respective toolbar.

In the illustrated embodiment, the row unit 30 includes an opener disc 50 rotatably and non-movably coupled to the frame 42 by a bearing assembly 52. For example, the bearing assembly may be disposed within a hub assembly that is coupled to the frame by a spindle. The bearing assembly 52 enables the opener disc 50 to freely rotate as the opener disc engages the soil, thereby enabling the opener disc 50 to excavate a trench within the soil. In the illustrated embodiment, the row unit 30 includes a single opener disc 50. Accordingly, the opener disc 50 is the only element on the row unit configured to initiate formation of a trench within the soil. While the opener disc is rotatably coupled to the frame by the bearing assembly in the illustrated embodiment, in other embodiments, the opener disc may be rotatably coupled to the frame by another suitable device (e.g., fastener, etc.).

In the illustrated embodiment, the row unit 30 includes a gauge wheel 54 configured to control a penetration depth of the opener disc 50 into the soil. The gauge wheel 54 is configured to rotate along the surface of the soil. Accordingly, adjusting the vertical position of the gauge wheel 54 relative to the frame 42 controls the penetration depth of the opener disc 50 into the soil. The gauge wheel 54 is rotatably coupled to a gauge wheel support arm, and the gauge wheel support arm is pivotally coupled to the frame 42. Accordingly, pivoting of the gauge wheel support arm drives the gauge wheel 54 to move vertically relative to the frame 42. In certain embodiments, the gauge wheel 54 is positioned against the opener disc 50 to remove soil from a side of the opener disc 50 during operation of the row unit 30.

The row unit 30 includes a depth adjustment assembly 56 configured to control the vertical position of the gauge wheel 54, thereby controlling the penetration depth of the opener disc 50 into the soil. In the illustrated embodiment, the depth adjustment assembly 56 includes a depth adjustment handle 58 and depth gauge notches 60. The depth adjustment handle 58 is non-rotatably coupled to the gauge wheel support arm and configured to drive the gauge wheel support arm to pivot, thereby controlling the vertical position of the gauge wheel 54 relative to the frame 42/opener disc 50. The depth adjustment handle 58 may be moved to any of the depth gauge notches 60 to adjust the vertical position of the gauge wheel 54. The depth gauge notches 60 block rotation of the depth adjustment handle 58, thereby maintaining the vertical position of the gauge wheel 54 (e.g., substantially fixing the position of the gauge wheel 54 relative to the frame 42). To adjust the vertical position of the gauge wheel 54/penetration depth of the opener disc 50, the depth adjustment handle 58 may be moved away from the depth gauge notches 60, thereby facilitating rotation of the depth adjustment handle 58 along the depth gauge notches 60. Upon release of the depth adjustment handle 58, a biasing member 61 may urge the depth adjustment handle 58 to engage the depth gauge notches 60, thereby blocking rotation of the depth gauge handle 58 among the depth gauge notches 60. While the vertical position of the gauge wheel/penetration depth of the opener disc is controlled by the depth adjustment handle/depth gauge notches in the illustrated embodiment, in other embodiments, another suitable depth adjustment assembly/device, such as an actuator, may be used to control the vertical position of the gauge wheel/penetration depth of the opener disc.

In the illustrated embodiment, the row unit 30 includes a scraper 62 disposed adjacent to the opener disc 50 and configured to remove accumulated soil from the opener disc 50. As illustrated, a mounting portion 64 of the scraper 62 is rigidly coupled to a mounting bracket 66 by fasteners 68. In alternative embodiments, the scraper may be coupled directly to the frame, or the scraper may be mounted to another suitable mounting structure. In the illustrated embodiment, the mounting bracket 66 is pivotally coupled to the frame 42 by a shaft, and a biasing member urges the bracket 66/scraper 62 toward the opener disc 50, thereby facilitating debris removal. While the illustrated row unit includes a scraper, in other embodiments, the scraper may be omitted. Furthermore, the row unit 30 includes an agricultural product tube 70 (e.g., seed tube) configured to direct agricultural product into the trench formed by the opener disc 50.

In the illustrated embodiment, the row unit 30 includes a closing system 33 configured to close the trench formed by the opener disc 50 and to pack soil on top of the deposited agricultural product. The closing system 33 includes a closing assembly 72 and a packer assembly 74. The closing assembly 72 includes a closing disc arm 76 and two closing discs 78 rotatably coupled to the closing disc arm 76. As illustrated, the closing disc arm 76 is pivotally coupled to the frame 42 at a pivot joint 79 (e.g., first pivot joint), and the closing disc arm 76 positions a rotational axis 80 of each closing disc 78 rearward of a rotational axis 82 of the opener disc 50 relative to the direction of travel 18 of the row unit 30. The closing discs 78 are configured to close the trench formed by the opener disc and/or to break up the side wall(s) of the trench, thereby enhancing the development of crops from the deposited seeds. In the illustrated embodiment, the closing discs 78 are substantially smooth. However, in other embodiments, at least one of the closing discs may be wavy and/or have multiple spikes extending radially outward from a central hub of the closing disc. Furthermore, in the illustrated embodiment, the closing assembly 72 has two closing discs 78. However, in other embodiments, the closing assembly may have more or fewer closing discs (e.g., 1, 2, 3, 4, or more). For example, a first pair of closing discs may be coupled to the frame of the row unit by a first arm, and a second pair of closing discs (e.g., positioned rearward of the first pair of closing discs) may be coupled to the frame of the row unit by a second arm.

In the illustrated embodiment, the closing assembly 72 of the closing system 33 includes a closing disc actuator 84 coupled to the closing disc arm 76 and to the frame 42. The closing disc actuator 84 is configured to control a downforce applied by the closing discs 78 to the soil. In the illustrated embodiment, the closing disc actuator 84 includes a first fluid actuator (e.g., hydraulic cylinder, hydraulic motor, pneumatic cylinder, pneumatic motor, etc.). Accordingly, the downforce applied by the closing discs 78 to the soil may be increased by increasing the fluid pressure within the first fluid actuator, and the downforce applied by the closing discs to the soil may be decreased by decreasing the fluid pressure within the first fluid actuator. Furthermore, in the illustrated embodiment, the closing system 33 includes a first valve assembly 86 fluidly coupled to the closing disc actuator (e.g., the first fluid actuator). The first valve assembly 86 is configured to control the fluid pressure within the first fluid actuator, thereby controlling the downforce applied by the closing discs to the soil. In addition, in the illustrated embodiment, the closing system 33 includes a controller 88 communicatively coupled to the first valve assembly 86. The controller 88 is configured to output a first output signal to the first valve assembly 86 indicative of instructions to control the closing disc actuator 84. In the illustrated embodiment, the controller 88 is an element of the closing system 33 and may be located in/on the agricultural seeding implement. In certain embodiments, the closing system of each row unit may include a respective controller. However, in other embodiments, a single controller or group of controllers may control the closing systems of all the row units of the agricultural seeding implement. In certain embodiments, the controller(s) may be located in/on the agricultural seeding implement, in/on an air cart coupled to the agricultural seeding implement, in/on a work vehicle coupled to the agricultural seeding implement, or a combination thereof.

In certain embodiments, the controller 88 is an electronic controller having electrical circuitry configured to control the first valve assembly 86. In the illustrated embodiment, the controller 88 includes a processor, such as the illustrated microprocessor 90, and a memory device 91. The controller 88 may also include one or more storage devices and/or other suitable components. The processor 90 may be used to execute software, such as software for controlling the first valve assembly, and so forth. Moreover, the processor 90 may include multiple microprocessors, one or more "general-purpose" microprocessors, one or more special-purpose microprocessors, and/or one or more application specific integrated circuits (ASICS), or some combination thereof. For example, the processor 90 may include one or more reduced instruction set (RISC) processors.

The memory device 91 may include a volatile memory, such as random access memory (RAM), and/or a nonvolatile memory, such as read-only memory (ROM). The memory device 91 may store a variety of information and may be used for various purposes. For example, the memory device 91 may store processor-executable instructions (e.g., firmware or software) for the processor 90 to execute, such as instructions for controlling the first valve assembly, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the first valve assembly, etc.), and any other suitable data.

While the closing disc actuator 84 includes the first fluid actuator in the illustrated embodiment, in other embodiments, the closing disc actuator may include another or an alternative suitable actuating device, such as an electromechanical actuator, a linear actuator, or an electric motor. In such embodiments, the actuating device may be directly communicatively coupled to the controller. Furthermore, while the closing disc actuator includes a single actuating device (e.g., the first fluid actuator) in the illustrated embodiment, in other embodiments, the closing disc actuator may include multiple actuating devices (e.g., of the same type or of different types).

As illustrated, the packer assembly 74 includes a packer wheel 92 and a packer wheel arm 94. The packer wheel arm 94 is pivotally coupled to the frame 42 at a pivot joint 96 (e.g., second pivot joint), and the packer wheel 92 is rotatably coupled to the packer wheel arm 94. The packer wheel 92 is configured to pack soil on top of the deposited agricultural product (e.g., to facilitate development of the resulting agricultural crop). The contact surface of the packer wheel may have any suitable shape (e.g., v-shaped, flat, etc.) and/or any suitable tread pattern (e.g., chevron treads, etc.). In the illustrated embodiment, the packer wheel arm 94 and the closing disc arm 76 are configured to rotate independently of one another relative to the frame. Accordingly, rotation of the packer wheel arm (e.g., in response to contact between the packer wheel and an obstruction) does not directly affect rotation of the closing disc arm, and rotation of the closing disc arm (e.g., in response to contact between the closing disc(s) and an obstruction) does not directly affect rotation of the packer wheel arm. In addition, independent rotation of the closing disc arm and the packer wheel arm enables the contact force between the closing disc(s) 78 and the soil to be adjusted independently of the contact force between the packer wheel 92 and the soil. Furthermore, while the closing disc actuator 84 is coupled to the closing disc arm 76 and to the frame 42 in the illustrated embodiment, in other embodiments, the closing disc actuator may be coupled to the closing disc arm and to the packer wheel arm.

In addition, the packer wheel arm 94 positions a rotational axis 98 of the packer wheel 92 rearward of the rotational axis 80 of each closing disc 78 relative to the direction of travel 18 of the row unit 30. While the illustrated packer assembly includes a single packer wheel, in other embodiments, the packer assembly may include additional packer wheel(s) (e.g., distributed along the direction of travel and/or positioned side-by-side). In addition, the packer wheel (e.g., the rotational axis of the packer wheel) may be oriented at any suitable angle relative to the direction of travel and/or a vertical axis (e.g., to facilitate packing of the soil on top of the deposited agricultural product). In certain embodiments, the angle of the packer wheel (e.g., the rotational axis of the packer wheel) relative to the direction of travel and/or the vertical axis may be adjustable via a suitable adjustment mechanism. Furthermore, in the illustrated embodiment, the pivot joint 79 of the closing disc arm 76 is positioned forward of the pivot joint 96 of the packer wheel arm 94, such that the closing disc arm pivot joint is separated from the packer wheel arm pivot joint on the frame. However, in other embodiments, the closing disc arm pivot joint may be positioned rearward of the packer wheel arm pivot joint, or the packer wheel arm and the closing disc arm may utilize a common pivot joint.

In the illustrated embodiment, the packer assembly 74 of the closing system 33 includes a packer wheel actuator 100 coupled to the packer wheel arm 94 and to the frame 42. The packer wheel actuator 100 is configured to control a downforce applied by the packer wheel 92 to the soil. In the illustrated embodiment, the packer wheel actuator 100 includes a second fluid actuator (e.g., hydraulic cylinder, hydraulic motor, pneumatic cylinder, pneumatic motor, etc.). Accordingly, the downforce applied by the packer wheel 92 to the soil may be increased by increasing the fluid pressure within the second fluid actuator, and the downforce applied by the packer wheel to the soil may be decreased by decreasing the fluid pressure within the second fluid actuator. Furthermore, in the illustrated embodiment, the closing system 33 includes a second valve assembly 102 fluidly coupled to the packer wheel actuator. The second valve assembly 102 is configured to control the fluid pressure within the second fluid actuator, thereby controlling the downforce applied by the packer wheel to the soil. In addition, the controller 88, which is communicatively coupled to the second valve assembly 102, is configured to output a second output signal to the second valve assembly 102 indicative of instructions to control the packer wheel actuator 100.

While the packer wheel actuator 100 includes the second fluid actuator in the illustrated embodiment, in other embodiments, the packer wheel actuator may include another or an alternative suitable actuating device, such as an electromechanical actuator, a linear actuator, or an electric motor. In such embodiments, the actuating device may be directly communicatively coupled to the controller. Furthermore, while the packer wheel actuator includes a single actuating device (e.g., the second fluid actuator) in the illustrated embodiment, in other embodiments, the packer wheel actuator may include multiple actuating devices (e.g., of the same type or of different types).

In certain embodiments, the controller 88 is configured to determine the instructions to control the closing disc actuator 84 based at least in part on a first determined contact force between the closing discs 78 and the soil, and/or the controller 88 is configured to determine the instructions to control the packer wheel actuator 100 based at least in part on a second determined contact force between the packer wheel 92 and the soil. For example, as discussed in detail below, the controller 88 may determine a target contact force between the closing discs 78 and the soil based on soil condition(s), residue coverage, trench closing effectiveness, or a combination thereof. The controller 88 may control the closing disc actuator 84 such that a determined contact force between the closing discs 78 and the soil is within a threshold range of the target contact force. In addition, the controller 88 may determine a target contact force between the packer wheel 92 and the soil based on soil condition(s), residue coverage, trench closing effectiveness, or a combination thereof. The controller 88 may control the packer wheel actuator 100 such that a determined contact force between the packer wheel 92 and the soil is within a threshold range of the target contact force.

In the illustrated embodiment, the closing system 33 includes a first downforce sensor 101 configured to output a first input signal to the controller 88 indicative of a first determined contact force between the closing discs 78 and the soil, and the closing system 33 includes a second downforce sensor 103 configured to output a second input signal to the controller 88 indicative of a second determined contact force between the packer wheel 92 and the soil. In the illustrated embodiment, the first downforce sensor 101 includes a fluid pressure sensor fluidly disposed between the first valve assembly 86 and the closing disc actuator 84. The first downforce sensor 101 may monitor the pressure of the fluid supplied to the closing disc actuator, thereby enabling the controller to determine the downforce applied by the closing discs 78 to the soil based on the monitored pressure. In addition, the second downforce sensor 103 includes a fluid pressure sensor fluidly disposed between the second valve assembly 102 and the packer wheel actuator 100. The second downforce sensor 103 may monitor the pressure of the fluid supplied to the packer wheel actuator, thereby enabling the controller to determine the downforce applied by the packer wheel 92 to the soil based on the monitored pressure.

While the first downforce sensor 101 and the second downforce sensor 103 include fluid pressure sensors in the illustrated embodiment, in other embodiments, the first downforce sensor and/or the second downforce sensor may include other suitable type(s) of sensor(s) configured to output respective input signal(s) indicative of the respective downforce (e.g., alone or in combination with the fluid pressure sensor). For example, in certain embodiments, at least one downforce sensor may include a torque sensor configured to monitor torque about the pivot joint of the respective arm. Furthermore, in certain embodiments, at least one downforce sensor may include a strain gauge configured to monitor a bending force within the respective arm. In addition, in certain embodiments, at least one downforce sensor may include a position sensor (e.g., ultrasonic transducer, capacitance sensor, inductance sensor, infrared sensor, radio frequency sensor, a sensor integrated within the respective actuator, etc.) configured to monitor an orientation of the respective arm relative to the frame. In such embodiments, the controller may determine the downforce based on the orientation of the respective arm (e.g., a lower position of the closing discs/packer wheel may be indicative of a higher contact force, and a higher position of the closing discs/packer wheel may be indicative of a lower contact force). Furthermore, in certain embodiments, at least one downforce sensor may be omitted, and the controller may provide open-loop control of the respective actuator.

As previously discussed, the controller 88 may determine a target contact force between the closing discs 84 and the soil based on soil condition(s), residue coverage, trench closing effectiveness, or a combination thereof. In addition, the controller 88 may determine a target contact force between the packer wheel 92 and the soil based on soil condition(s), residue coverage, trench closing effectiveness, or a combination thereof. In the illustrated embodiment, the closing system 33 includes a soil sensor 104 configured to output a third input signal to the controller 88 indicative of a measured soil condition. In certain embodiments, the controller 88 is configured to determine the instructions to control the closing disc actuator 84 and/or the packer wheel actuator 100 based at least in part on the measured soil condition. In the illustrated embodiment, the soil sensor 104 includes an electrical conductivity sensor mounted on the scraper 62 and configured to monitor the soil moisture content. For example, if the controller determines that the soil moisture content is high, the controller may reduce the target contact forces to reduce compaction of the soil, and if the controller determines that the soil moisture content is lower, the controller may increase the target contact forces to cause the closing discs/packer wheel to maintain contact with the soil during operation of the row unit. While the soil sensor 104 includes an electrical conductivity soil moisture content sensor in the illustrated embodiment, in other embodiments, the soil sensor may include another suitable type of soil moisture sensor, such as a non-contact electrostatic sensor. Furthermore, the soil sensor may include a sensor configured to monitor soil composition, soil firmness, soil density, or a combination thereof. Such sensors may include radio frequency transducer(s), infrared transducer(s), optical sensor(s) (e.g., camera(s)), LIDAR sensor(s), RADAR sensor(s), another suitable sensor type, or a combination thereof.

In the illustrated embodiment, the closing system 33 includes a residue sensor 105 configured to output a fourth input signal to the controller 88 indicative of a measured residue coverage. In certain embodiments, the controller 88 is configured to determine the instructions to control the closing disc actuator 84 and/or the packer wheel actuator 100 based at least in part on the measured residue coverage. In the illustrated embodiment, the residue sensor 105 includes an optical sensor positioned proximate to the front portion of the row unit 30 relative to the direction of travel 18. The optical sensor is directed toward a region of the field forward of the row unit 30 along the direction of travel 18. If the controller determines that the residue coverage is high (e.g., percentage of the field covered with residue), the controller may increase the target contact forces to increase closing effectiveness, and if the controller determines that the residue coverage is lower (e.g., percentage of the field covered with residue), the controller may decrease the target contact forces to reduce compaction. While the residue sensor 105 includes an optical sensor in the illustrated embodiment, in other embodiments, the residue sensor may include another/additional suitable sensor configured to monitor residue coverage, such as a radio frequency transducer, an infrared transducer, a LIDAR sensor, or a RADAR sensor.

In the illustrated embodiment, the closing system 33 includes a closing effectiveness sensor 107 configured to output a fifth input signal to the controller 88 indicative of a measured closing effectiveness. In certain embodiments, the controller 88 is configured to determine the instructions to control the closing disc actuator 84 and/or the packer wheel actuator 100 based at least in part on the measured closing effectiveness. In the illustrated embodiment, the closing effectiveness sensor 107 includes an optical sensor positioned proximate to the rear portion of the row unit 30 relative to the direction of travel 18. The optical sensor is directed toward a region of the field rearward of the row unit 30 along the direction of travel 18. If the controller determines that the closing is less effective, the controller may increase the target contact forces to increase closing effectiveness. While the closing effectiveness sensor 107 includes an optical sensor in the illustrated embodiment, in other embodiments, the closing effectiveness sensor may include another/additional suitable sensor configured to monitor closing effectiveness, such as a radio frequency transducer, an infrared transducer, a LIDAR sensor, or a RADAR sensor.

While the closing system includes the residue sensor, the soil condition sensor, and the closing effectiveness sensor in the illustrated embodiment, in other embodiments, the closing system may have one or two of these sensors. Furthermore, in certain embodiments, the closing system may have additional sensors (e.g., residue sensor(s), soil condition senor(s), closing effectiveness sensor(s), another suitable type of sensor, or a combination thereof). For example, in certain embodiments, the closing system may include an opener disc penetration depth sensor, a ground speed sensor, a trench depth sensor, another suitable type of sensor, or a combination thereof. The controller may be configured to determine the target contact forces based on input from such sensor(s) (e.g., alone or in combination with any of the sensors disclosed above). While the controller is configured to determine the target contact forces based on sensor input in the illustrated embodiment, in other embodiments, at least one target contact force may be manually input (e.g., via a user interface communicatively coupled to the controller).

The row unit 30 includes a spring assembly 106 configured to urge the opener disc into engagement with the soil, to urge the gauge wheel against the soil surface, and to facilitate upward vertical movement of the row unit frame 42 (e.g., in response to contact between the opener disc 50 and an obstruction within the field). In the illustrated embodiment, the spring assembly 106 includes a bolt/tube assembly 108 that connects a lower trunnion 110 to an upper trunnion 112. The bolt/tube assembly 108 and lower trunnion 110 are surrounded by a compression spring 114. In addition, the spring assembly 106 is rotatably coupled to the lower link 38 by a fastener 116 to enable the spring assembly 106 to rotate relative to the lower link 38. In certain embodiments, a downforce actuator is configured to compress the spring assemblies of a group of row units (e.g., on a sub-frame/sub-bar). The force applied by the downforce actuator may be controlled to control the downforce applied by the gauge wheel 54 to the soil surface (e.g., while compressing the spring 114). In addition, the spring 114 is configured to compress to facilitate upward vertical movement of the frame 42 in response to the opener disc 50 or the gauge wheel 54 encountering an obstruction (e.g., rock, branch, etc.) within the field. While the row unit includes the spring assembly in the illustrated embodiment, in other embodiments, the spring assembly may be omitted. For example, in certain embodiments, the spring assembly may be omitted, and a downforce actuator may extend from the toolbar to the row unit (e.g., to the frame of the row unit, to a link of the linkage assembly, etc.).

In embodiments having downforce actuator(s) (e.g., configured to urge a group of row units downwardly and/or extending from the toolbar to the row unit), the controller may control the downforce actuator(s) to control the downforce applied by the gauge wheel to the soil surface. In certain embodiments, the downforce actuator(s) may include fluid actuator(s) (e.g., hydraulic cylinder(s), hydraulic motor(s), pneumatic cylinder(s), pneumatic motor(s), etc.). Accordingly, the downforce applied by the gauge wheel to the soil may be increased by increasing the fluid pressure within the fluid actuator(s), and the downforce applied by the gauge wheel to the soil may be decreased by decreasing the fluid pressure within the fluid actuator(s). Furthermore, in such embodiments, a valve assembly may be fluidly coupled to the downforce actuator(s). The valve assembly may be configured to control the fluid pressure within the fluid actuator(s), thereby controlling the downforce applied by the gauge wheel to the soil. In addition, the controller may be communicatively coupled to the valve assembly. The controller may be configured to output an output signal to the valve assembly indicative of instructions to control the downforce actuator(s) (e.g., based on soil condition(s), residue coverage, trench closing effectiveness, etc.). While fluid actuator(s) are disclosed above, in other embodiments, the downforce actuator(s) may include other or alternative suitable actuator(s), such as electromechanical actuator(s), linear actuator(s), or electric motor(s). In such embodiments, the other/alternative actuator(s) may be directly communicatively coupled to the controller.

Furthermore, as previously discussed, a depth adjustment actuator may be used to control the vertical position of the gauge wheel/penetration depth of the opener disc. In such embodiments, the controller may control the depth adjustment actuator to control the opener disc penetration depth. In certain embodiments, the depth adjustment actuator may include a fluid actuator (e.g., hydraulic cylinder, hydraulic motor, pneumatic cylinder, pneumatic motor, etc.). In such embodiments, a valve assembly may be fluidly coupled to the depth adjustment actuator. The valve assembly may be configured to control the fluid pressure within the fluid actuator, thereby controlling the penetration depth of the opener disc. In addition, the controller may be communicatively coupled to the valve assembly. The controller may be configured to output an output signal to the valve assembly indicative of instructions to control the opener disc penetration depth (e.g., based on soil condition(s), residue coverage, trench closing effectiveness, etc.). While a fluid actuator is disclosed above, in other embodiments, the depth adjustment actuator may include another or an alternative suitable actuator, such as an electromechanical actuator, a linear actuator, or an electric motor. In such embodiments, the other/alternative actuator may be directly communicatively coupled to the controller.

Because the closing disc arm and the packer wheel arm are independently rotatably coupled to the frame of the row unit, the contact force between the packer wheel and the soil (e.g., the soil surface) may be controlled substantially independently of the contact force between the closing disc(s) and the soil. For example, the contact force between the closing disc(s) and the soil may be adjusted to a first value via the closing disc actuator, and the contact force between the packer wheel and the soil may be adjusted to a second value via the packer wheel actuator. Each contact force may be adjusted for particular field conditions (e.g., soil composition, soil moisture, etc.). As a result, the closing system may be utilized to effectively close the trench and/or break up the side wall(s) of the trench for a variety of field conditions (e.g., as compared to utilizing a different closing system for different field conditions).

In the illustrated embodiment, the row unit 30 including the closing system 33 is a seeding/seeder row unit, as compared to a planting/planter row unit. Accordingly, a storage compartment (e.g., hopper, mini-hopper, etc.) for agricultural product is not non-movably coupled to the frame 42 (e.g., as compared to a planting/planter row unit that includes an agricultural product storage compartment, such as a hopper or a mini-hopper configured to receive agricultural product from a central storage compartment, non-movably coupled to the frame). In addition, the seeding/seeder row unit 30 includes a single opener disc 50 (e.g., as compared to a planting/planter row unit that includes a pair of opener discs arranged to form a v-shaped trench). Furthermore, in the illustrated embodiment, a metering device is not non-movably coupled to the frame of the row unit (e.g., as compared to a planting/planter row unit that includes a frame-mounted metering device, such as a vacuum seed meter). However, in other embodiments, a metering device (e.g., seed meter) may be non-movably coupled to the frame of the row unit.

Figure 3:
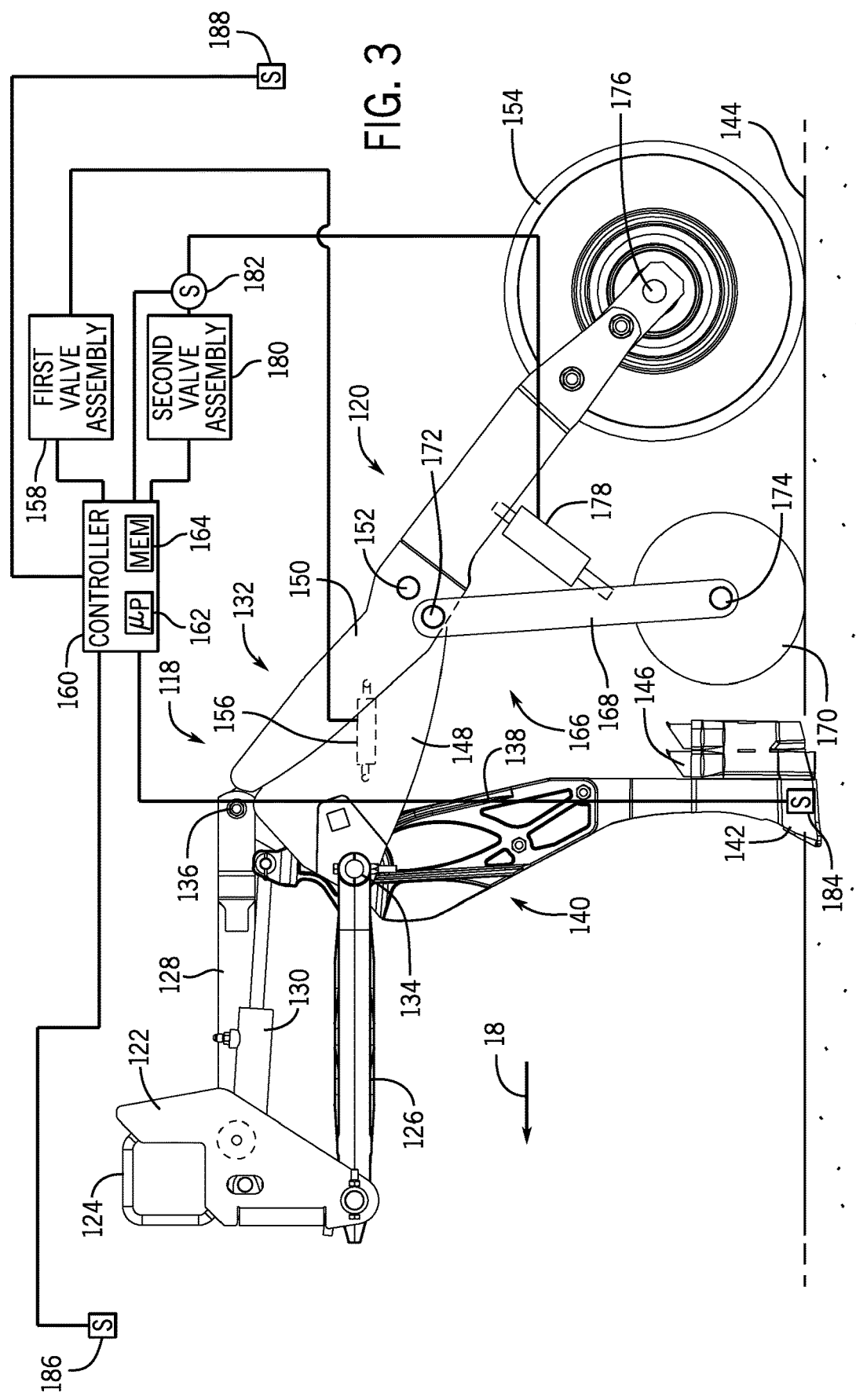
FIG. 3 is a side view of another embodiment of a row unit that may be employed within the agricultural seeding implement of FIG. 1, in which the row unit has an embodiment of a closing system.

FIG. 3 is a side view of another embodiment of a row unit 118 that may be employed within the agricultural seeding implement of FIG. 1, in which the row unit 118 has an embodiment of a closing system 120. As illustrated, the row unit 118 includes a frame support 122 and a mounting bracket 124. The frame support 122 and the mounting bracket 124 are configured to interface with a toolbar, thereby securing the row unit 118 to the agricultural seeding implement frame. While the illustrated embodiment includes a single mounting bracket 124, in other embodiments, the row unit may include additional mounting brackets (e.g., 2, 3, 4, 5, 6, or more). Furthermore, while the illustrated row unit 118 is coupled to the toolbar by the frame support 122 and the mounting bracket(s) 124, in other embodiments, the row unit may be coupled to the toolbar by any other suitable connection system (e.g., fastener(s), a welded connection, an adhesive connection, etc.).

In addition, the row unit 118 includes a first linkage member 126, a second linkage member 128, and a biasing device, such as the illustrated downforce cylinder 130 (e.g., hydraulic or pneumatic piston-cylinder assembly). As illustrated, the first linkage member 126 (e.g., first link) and the second linkage member 128 (e.g., second link) extend from the frame support 122 to a packer wheel arm 132 of the closing system 120. The first linkage member 126 is pivotally coupled to the frame support 122, thereby pivotally coupling the first linkage member 126 to the toolbar of the agricultural seeding implement. In addition, the first linkage member 126 is pivotally coupled to the packer wheel arm 132 at a first pivot joint 134. In the illustrated embodiment, the second linkage member 128 is pivotally coupled to the frame support 122, thereby pivotally coupling the second linkage member 128 to the toolbar of the agricultural seeding implement. Furthermore, the second linkage member 128 is pivotally coupled to the packer wheel arm 132 at a second pivot joint 136. Accordingly, the first and second linkage members form a linkage (e.g., parallel linkage) between the frame support 122 and the packer wheel arm 132. While the linkage is formed by the first and second linkage members in the illustrated embodiment, in other embodiments, the packer wheel arm may be coupled to the frame support by any other suitable type of linkage (e.g., a linkage including only the first linkage member, a linkage including only the second linkage member, etc.).

The downforce cylinder 130 is pivotally coupled to the frame support 122 and to a shank 138 of an opener 140. In addition, the shank 138 is pivotally coupled to the first linkage member 126 and to the packer wheel arm 132 at the first pivot joint 134. A blade 142 of the opener 140 is rigidly coupled (e.g., non-movably coupled, non-rotatably coupled, non-translatably coupled, etc.) to the shank 138 and configured to engage the soil 144. Applying pressurized fluid (e.g., hydraulic fluid, air, etc.) to the downforce cylinder 130 urges the packer wheel arm 132 and the opener 140 to translate downwardly. Translational movement of the packer wheel arm 132 and the opener 140 is controlled by the linkage. For example, the linkage may cause the packer wheel arm 132 and the opener 140 to translate along a vertical axis. While the illustrated embodiment utilizes a downforce cylinder 130 as the biasing member, in alternative embodiments, the row unit may include another suitable type of biasing member, such as a spring or a pneumatic strut, for example.

The blade 142 is configured to form a trench within the soil 144 as the row unit 118 moves along the direction of travel 18. In the illustrated embodiment, the row unit 118 includes an agricultural product tube 146 (e.g., seed tube) configured to direct agricultural product into the trench formed by the blade 142. In the illustrated embodiment, the row unit 118 includes two agricultural product tubes 146 configured to deposit two agricultural products (e.g., two different agricultural products) into the soil. However, in other embodiments, the row unit may include more or fewer agricultural product tubes (e.g., 1, 2, 3, 4, or more).

In the illustrated embodiment, the packer wheel arm 132 includes a first portion 148 and a second portion 150 pivotally coupled to one another at a third pivot joint 152. The first portion 148 is pivotally coupled to the first linkage member 126 and to the second linkage member 128, and a packer wheel 154 of the closing system 120 is rotatably coupled to the second portion 150 of the packer wheel arm 132. The packer wheel 154 rotates along the soil surface to both pack the soil on top of deposited agricultural product and to control the penetration depth of the blade 142. In the illustrated embodiment, the closing system 120 includes a packer wheel actuator 156 coupled to the first portion 148 and to the second portion 150 of the packer wheel arm 132. The packer wheel actuator 156 is configured to control a position of the packer wheel 154 relative to the opener 140 to control the penetration depth of the blade 142 within the soil 144. For example, the packer wheel actuator 156 may drive the second portion 150 of the packer wheel arm 132 to rotate upwardly relative to the first portion 148 of the packer wheel arm 132, thereby moving the packer wheel 154 upwardly relative to the opener 140. As a result, the penetration depth of the blade 142 may increase. In addition, the packer wheel actuator 156 may drive the second portion 150 of the packer wheel arm 132 to rotate downwardly relative to the first portion 148 of the packer wheel arm 132, thereby moving the packer wheel 154 downwardly relative to the opener 140. As a result, the penetration depth of the blade 142 may decrease.

In the illustrated embodiment, the packer wheel actuator 156 includes a first fluid actuator (e.g., hydraulic cylinder, hydraulic motor, pneumatic cylinder, pneumatic motor, etc.). Furthermore, in the illustrated embodiment, the row unit 118 includes a first valve assembly 158 fluidly coupled to the packer wheel actuator 156. The first valve assembly 158 is configured to control the fluid pressure within the first fluid actuator, thereby controlling the penetration depth of the blade. In addition, in the illustrated embodiment, the row unit 118 includes a controller 160 communicatively coupled to the first valve assembly 158. The controller 160 is configured to output a first output signal to the first valve assembly 158 indicative of instructions to control the packer wheel actuator 156. In the illustrated embodiment, the controller 160 is an element of the row unit 118 and may be located in/on the agricultural seeding implement. In certain embodiments, each row unit may include a respective controller. However, in other embodiments, a single controller or group of controllers may control all the row units of the agricultural seeding implement. In certain embodiments, the controller(s) may be located in/on the agricultural seeding implement, in/on an air cart coupled to the agricultural seeding implement, in/on a work vehicle coupled to the agricultural seeding implement, or a combination thereof.

In certain embodiments, the controller 160 is an electronic controller having electrical circuitry configured to control the first valve assembly 158. In the illustrated embodiment, the controller 160 includes a processor, such as the illustrated microprocessor 162, and a memory device 164. The controller 160 may also include one or more storage devices and/or other suitable components. The processor 162 may be used to execute software, such as software for controlling the first valve assembly, and so forth. Moreover, the processor 162 may include multiple microprocessors, one or more "general-purpose" microprocessors, one or more special-purpose microprocessors, and/or one or more application specific integrated circuits (ASICS), or some combination thereof. For example, the processor 162 may include one or more reduced instruction set (RISC) processors.

The memory device 164 may include a volatile memory, such as random access memory (RAM), and/or a nonvolatile memory, such as read-only memory (ROM). The memory device 164 may store a variety of information and may be used for various purposes. For example, the memory device 164 may store processor-executable instructions (e.g., firmware or software) for the processor 162 to execute, such as instructions for controlling the first valve assembly, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the first valve assembly, etc.), and any other suitable data.

While the packer wheel actuator 156 includes the first fluid actuator in the illustrated embodiment, in other embodiments, the packer wheel actuator may include another or an alternative suitable actuating device, such as an electromechanical actuator, a linear actuator, or an electric motor. In such embodiments, the actuating device may be directly communicatively coupled to the controller. Furthermore, while the packer wheel actuator includes a single actuating device (e.g., the first fluid actuator) in the illustrated embodiment, in other embodiments, the packer wheel actuator may include multiple actuating devices (e.g., of the same type or of different types). In addition, while the packer wheel actuator is positioned proximate to the linkage members in the illustrated embodiment, in other embodiments, the packer wheel actuator may be positioned proximate to the packer wheel or at another suitable location along the packer wheel arm.

While the row unit includes a packer wheel actuator in the illustrated embodiment, in other embodiments, another suitable type of packer wheel adjustment device/assembly may be utilized to control the position of the packer wheel relative to the opener. For example, in certain embodiments, a packer wheel adjustment assembly may include a fastener disposed within a slot in the second portion of the packer wheel arm and a corresponding slot within the first portion of the packer wheel arm. While in a locked configuration, the fastener blocks rotation of the second portion of the packer wheel arm with respect to the first portion of the packer wheel arm. Conversely, while in an unlocked configuration, the fastener may be translated within the respective slots to adjust the rotation of the second portion of the packer wheel arm about the third pivot joint relative to the first portion of the packer wheel arm. Adjusting the rotation of the second portion relative to the first portion controls the vertical position of the packer wheel relative to the blade of the opener, thereby controlling the penetration depth of the blade. Once a target orientation of the second portion relative to the first portion is established (e.g., corresponding to a target penetration depth), the fastener may be transitioned to the locked configuration, thereby blocking rotation of the second portion of the packer wheel arm relative to the first portion. Furthermore, in certain embodiments, a packer wheel adjustment assembly may include a pin configured to be disposed within respective openings in the first and second portions of the packer wheel arm. At least one of the first portion or the second portion of the packer wheel arm may include multiple openings, and the position of the packer wheel relative to the blade may be controlled by disposing the pin within a selected opening of the multiple openings. In further embodiments, a packer wheel adjustment assembly may include a cam and a stopper. The position of the second portion relative to the first portion may be controlled by rotating the cam, thereby controlling the position of the packer wheel relative to the blade. In addition, the stopper may selectively block rotation of the cam to maintain the packer wheel in a selected position. Furthermore, in certain embodiment, the packer wheel actuator/packer wheel adjustment assembly may be omitted. In such embodiments, the packer wheel arm may include a single portion.

In the illustrated embodiment, the closing system 120 of the row unit 118 includes a closing assembly 166 configured to close the trench formed by the blade 142 of the opener 140. The closing assembly 166 includes a closing disc arm 168 and a single closing disc 170 rotatably coupled to the closing disc arm 168. As illustrated, the closing disc arm 168 is pivotally coupled to the second portion 150 of the packer wheel arm 132 at a fourth pivot joint 172, and the closing disc arm 168 positions a rotational axis 174 of the closing disc 170 rearward of the blade 142 of the opener 140 relative to the direction of travel 18 of the row unit 118. In addition, the packer wheel arm 132 positions a rotational axis 176 of the packer wheel 154 rearward of the rotational axis 174 of the closing disc 170 relative to the direction of travel 18 of the row unit 118. While the closing disc arm 168 is pivotally coupled to the second portion 150 of the packer wheel arm 132 in the illustrated embodiment, in other embodiments, the closing disc arm may be pivotally coupled to the first portion of the packer wheel arm.

The closing disc 170 is configured to close the trench formed by the blade 142 and/or to break up the side wall(s) of the trench, thereby enhancing the development of crops from the deposited seeds. In the illustrated embodiment, the closing disc 170 is substantially smooth. However, in other embodiments, the closing disc may be wavy and/or have multiple spikes extending radially outward from a central hub of the closing disc. Furthermore, in the illustrated embodiment, the closing assembly 166 has a single closing disc 170. However, in other embodiments, the closing assembly may have addition closing discs (e.g., 2, 3, 4, or more), such as multiple closing discs rotatably coupled to the closing disc arm. By way of example, one closing disc may be coupled to the packer wheel arm by a first closing disc arm, and a second closing disc (e.g., positioned rearward of the first closing disc) may be coupled to the packer wheel arm by a second closing disc arm. Each closing disc disclosed herein may be formed from a suitable material. For example, the closing disc may be formed from a rigid material, such as metal (e.g., steel, etc.), or the closing disc may be formed from a resilient material, such as rubber or polyurethane.

The closing assembly 166 includes a closing disc actuator 178 coupled to the packer wheel arm 132 (e.g., the second portion 150 of the packer wheel arm 132) and to the closing disc arm 168. The closing disc actuator 178 is configured to control a downforce applied by the closing disc 170 to the soil 144. In the illustrated embodiment, the closing disc actuator 178 includes a second fluid actuator (e.g., hydraulic cylinder, hydraulic motor, pneumatic motor, etc.). Accordingly, the downforce applied by the closing disc 170 to the soil 144 may be increased by increasing the fluid pressure within the second fluid actuator, and the downforce applied by the closing disc 170 to the soil 144 may be decreased by decreasing the fluid pressure within the second fluid actuator. Furthermore, in the illustrated embodiment, the row unit 118 includes a second valve assembly 180 fluidly coupled to the closing disc actuator 178. The second valve assembly 180 is configured to control the fluid pressure within the second fluid actuator, thereby controlling the downforce applied by the closing disc to the soil. In addition, the controller 160, which is communicatively coupled to the second valve assembly 180, is configured to output a second output signal to the second valve assembly 180 indicative of instructions to control the closing disc actuator 178.

While the closing disc actuator 178 includes the second fluid actuator in the illustrated embodiment, in other embodiments, the closing disc actuator may include another or an alternative suitable actuating device, such as an electromechanical actuator, a linear actuator, or an electric motor. In such embodiments, the actuating device may be directly communicatively coupled to the controller. Furthermore, while the closing disc actuator includes a single actuating device (e.g., the second fluid actuator) in the illustrated embodiment, in other embodiments, the closing disc actuator may include multiple actuating devices (e.g., of the same type or of different types).

In certain embodiments, the controller 160 is configured to determine the instructions to control the closing disc actuator 178 based at least in part on a determined contact force between the closing disc 170 and the soil. For example, as discussed in detail below, the controller 160 may determine a target contact force between the closing disc 170 and the soil based on soil condition(s), residue coverage, trench closing effectiveness, or a combination thereof. The controller 160 may control the closing disc actuator 178 such that the determined contact force between the closing disc 170 and the soil is within a threshold range of the target contact force.

In the illustrated embodiment, the row unit 118 includes a downforce sensor 182 configured to output a first input signal to the controller 160 indicative of the determined contact force. In the illustrated embodiment, the downforce sensor 182 includes a fluid pressure sensor fluidly disposed between the second valve assembly 180 and the closing disc actuator 178. The downforce sensor 182 may monitor the pressure of the fluid supplied to the closing disc actuator, thereby enabling the controller to determine the downforce applied by the closing disc 170 to the soil based on the monitored pressure.

While the downforce sensor 182 includes a fluid pressure sensor in the illustrated embodiment, in other embodiments, the downforce sensor may include another suitable type of sensor configured to output an input signal indicative of the downforce. For example, in certain embodiments, the downforce sensor may include a torque sensor configured to monitor torque about the fourth pivot joint of the closing disc arm. Furthermore, in certain embodiments, the downforce sensor may include a strain gauge configured to monitor a bending force within the closing disc arm. In addition, in certain embodiments, the downforce sensor may include a position sensor (e.g., ultrasonic transducer, capacitance sensor, inductance sensor, infrared sensor, radio frequency sensor, a sensor integrated within the respective actuator, etc.) configured to monitor an orientation of the closing disc arm relative to the frame. In such embodiments, the controller may determine the downforce based on the orientation of the closing disc arm (e.g., a lower position of the closing disc may be indicative of a higher contact force, and a higher position of the closing disc may be indicative of a lower contact force). Furthermore, in certain embodiments, the downforce sensor may include multiple sensors (e.g., of the same type or of different types), or the downforce sensor may be omitted, and the controller may provide open-loop control of the closing disc actuator.

As previously discussed, the controller 160 may determine a target contact force between the closing disc 170 and the soil based on soil condition(s), residue coverage, trench closing effectiveness, or a combination thereof. In the illustrated embodiment, the row unit 118 includes a soil sensor 184 configured to output a second input signal to the controller 160 indicative of a measured soil condition. In certain embodiments, the controller 160 is configured to determine the instructions to control the closing disc actuator 178 based at least in part on the measured soil condition. In the illustrated embodiment, the soil sensor 184 includes an electrical conductivity sensor mounted on the blade 142 of the opener 140 and configured to monitor the soil moisture content. For example, if the controller determines that the soil moisture content is high, the controller may reduce the target contact force to reduce compaction of the soil, and if the controller determines that the soil moisture content is lower, the controller may increase the target contact force to cause the closing disc to maintain contact with the soil during operation of the row unit. While the soil sensor 184 includes an electrical conductivity soil moisture content sensor in the illustrated embodiment, in other embodiments, the soil sensor may include another suitable type of soil moisture sensor, such as a non-contact electrostatic sensor. Furthermore, the soil sensor may include a sensor configured to monitor soil composition, soil firmness, soil density, or a combination thereof. Such sensors may include radio frequency transducer(s), infrared transducer(s), optical sensor(s) (e.g., camera(s)), LIDAR sensor(s), RADAR sensor(s), another suitable sensor type, or a combination thereof.

In the illustrated embodiment, the row unit 118 includes a residue sensor 186 configured to output a third input signal to the controller 160 indicative of a measured residue coverage. In certain embodiments, the controller 160 is configured to determine the instructions to control the closing disc actuator 178 based at least in part on the measured residue coverage. In the illustrated embodiment, the residue sensor 186 includes an optical sensor positioned proximate to the front portion of the row unit 118 relative to the direction of travel 18. The optical sensor is directed toward a region of the field forward of the row unit 118 along the direction of travel 18. If the controller determines that the residue coverage is high (e.g., percentage of the field covered with residue), the controller may increase the target contact force to increase closing effectiveness, and if the controller determines that the residue coverage is lower (e.g., percentage of the field covered with residue), the controller may decrease the target contact force to reduce compaction. While the residue sensor 186 includes an optical sensor in the illustrated embodiment, in other embodiments, the residue sensor may include another/additional suitable sensor configured to monitor residue coverage, such as a radio frequency transducer, an infrared transducer, a LIDAR sensor, or a RADAR sensor.

In the illustrated embodiment, the row unit 118 includes a closing effectiveness sensor 188 configured to output a fourth input signal to the controller 160 indicative of a measured closing effectiveness. In certain embodiments, the controller 160 is configured to determine the instructions to control the closing disc actuator 178 based at least in part on the measured closing effectiveness. In the illustrated embodiment, the closing effectiveness sensor 188 includes an optical sensor positioned proximate to the rear portion of the row unit 118 relative to the direction of travel 18. The optical sensor is directed toward a region of the field rearward of the row unit 118 along the direction of travel 18. If the controller determines that the closing is less effective, the controller may increase the target contact force to increase closing effectiveness. While the closing effectiveness sensor 188 includes an optical sensor in the illustrated embodiment, in other embodiments, the closing effectiveness sensor may include another/additional suitable sensor configured to monitor closing effectiveness, such as a radio frequency transducer, an infrared transducer, a LIDAR sensor, or a RADAR sensor.

While the row unit includes the residue sensor, the soil condition sensor, and the closing effectiveness sensor in the illustrated embodiment, in other embodiments, the row unit may have one or two of these sensors. Furthermore, in certain embodiments, the row unit may have additional sensors (e.g., residue sensor(s), soil condition senor(s), closing effectiveness sensor(s), another suitable type of sensor, or a combination thereof). For example, in certain embodiments, the row unit may include an opener disc penetration depth sensor, a ground speed sensor, a trench depth sensor, another suitable type of sensor, or a combination thereof. The controller may be configured to determine the target contact force based on input from such sensor(s) (e.g., alone or in combination with any of the sensors disclosed above). While the controller is configured to determine the target contact force based on sensor input in the illustrated embodiment, in other embodiments, the target contact force may be manually input (e.g., via a user interface communicatively coupled to the controller).

Furthermore, in the illustrated embodiment, the packer wheel actuator 156 is configured to control the vertical position of the packer wheel 154 relative to the opener 140 to control the penetration depth of the blade 142 of the opener 140 within the soil 144. The controller 160 is configured to output the second output signal to the second valve assembly 180 indicative of instructions to control the blade penetration depth. In certain embodiments, the controller 160 may determine a target penetration depth of the blade based on soil condition(s) (e.g., as determined based on feedback from the soil sensor 184), residue coverage (e.g., as determined based on feedback from the residue sensor 186), trench closing effectiveness (e.g., as determined based on feedback from the closing effectiveness sensor 188), or a combination thereof. For example, if the controller determines that the soil moisture content is high, the controller may reduce the target penetration depth, and if the controller determines that the soil moisture content is lower, the controller may increase the target penetration depth. Furthermore, if the controller determines that the residue coverage is high (e.g., percentage of the field covered with residue), the controller may reduce the target penetration depth, and if the controller determines that the residue coverage is lower (e.g., percentage of the field covered with residue), the controller may increase the target penetration depth. In addition, if the controller determines that the closing is less effective, the controller may increase the target penetration depth, and if the controller determines that the closing is more effective, the controller may reduce the target penetration depth. Once the target penetration depth is determined, the controller 160 may control the packer wheel actuator 156 such that a penetration depth of the blade 142 within the soil 144 (e.g., as determined based on feedback from one or more penetration depth sensors, such as an angle sensor configured to measure the angle of the second portion of the packer wheel arm relative to the first portion of the packer wheel arm, electrical conductivity sensor coupled to the blade, etc.) is within a threshold range of the target penetration depth.

As previously discussed, the row unit 118 includes the downforce cylinder 130 configured to urge the packer wheel arm 132 and the opener 140 to translate downwardly. Accordingly, the downforce cylinder 130 may control the contact force between the packer wheel 154 and the soil 144 (e.g., the soil surface). For example, the downforce applied by the packer wheel to the soil may be increased by increasing the fluid pressure within the downforce cylinder, and the downforce applied by the packer wheel to the soil may be decreased by decreasing the fluid pressure within the downforce cylinder. Furthermore, a valve assembly may be fluidly coupled to the downforce cylinder. The valve assembly may be configured to control the fluid pressure within the downforce cylinder, thereby controlling the downforce applied by the packer wheel to the soil. In addition, the controller may be communicatively coupled to the valve assembly. The controller may be configured to output an output signal to the valve assembly indicative of instructions to control the downforce cylinder (e.g., based on soil condition(s), residue coverage, trench closing effectiveness, etc.). In certain embodiments, the controller may determine a target contact force between the packer wheel and the soil based on soil condition(s) (e.g., as determined based on feedback from the soil sensor 184), residue coverage (e.g., as determined based on feedback from the residue sensor 186), trench closing effectiveness (e.g., as determined based on feedback from the closing effectiveness sensor 188), or a combination thereof.

By way of example, if the controller determines that the soil moisture content is high, the controller may reduce the target contact force to reduce compaction of the soil, and if the controller determines that the soil moisture content is lower, the controller may increase the target contact force to cause the packer wheel to maintain contact with the soil during operation of the row unit. Furthermore, if the controller determines that the residue coverage is high (e.g., percentage of the field covered with residue), the controller may increase the target contact force to increase closing effectiveness, and if the controller determines that the residue coverage is lower (e.g., percentage of the field covered with residue), the controller may decrease the target contact force to reduce compaction. In addition, if the controller determines that the closing is less effective, the controller may increase the target contact force to increase closing effectiveness. Once the target contact force is determined, the controller may control the downforce cylinder such that a determined contact force between the packer wheel and the soil (e.g., as determined based on feedback from a downforce sensor, such as a fluid pressure sensor fluidly disposed between the valve assembly and the downforce cylinder, torque sensor, position sensor, etc.) is within a threshold range of the target contact force. While a fluid (e.g., hydraulic, pneumatic, etc.) cylinder is disclosed above, in other embodiments, any suitable type of downforce actuator may be utilized, such as a rotary fluid actuator (e.g., hydraulic motor, pneumatic motor, etc.), an electromechanical actuator, a linear actuator, or an electric motor. In certain embodiments, the actuator may be directly communicatively coupled to the controller.

The closing disc actuator 178 enables the contact force between the closing disc 170 and the soil 144 to be controlled substantially independently of the contact force between the packer wheel 154 and the soil 144 (e.g., the soil surface). For example, the contact force between the packer wheel and the soil may be adjusted to a first value by controlling the fluid pressure within the downforce cylinder 130, and the contact force between the closing disc and the soil may be adjusted to a second value by controlling the closing disc actuator 178. Each contact force may be adjusted for particular field conditions (e.g., soil composition, soil moisture, etc.). As a result, the closing system may be utilized to effectively close the trench and/or to break up the side wall(s) of the trench for a variety of field conditions (e.g., as compared to utilizing different closing systems for different field conditions). While the closing disc actuator 178 is coupled to the second portion 150 of the packer wheel arm 132 in the illustrated embodiment, in other embodiments, the closing disc actuator may be coupled to the first portion of the packer wheel arm, or the closing disc actuator may be coupled to the single portion of the packer wheel arm in embodiments in which the packer wheel arm includes a single portion.

Figure 4:
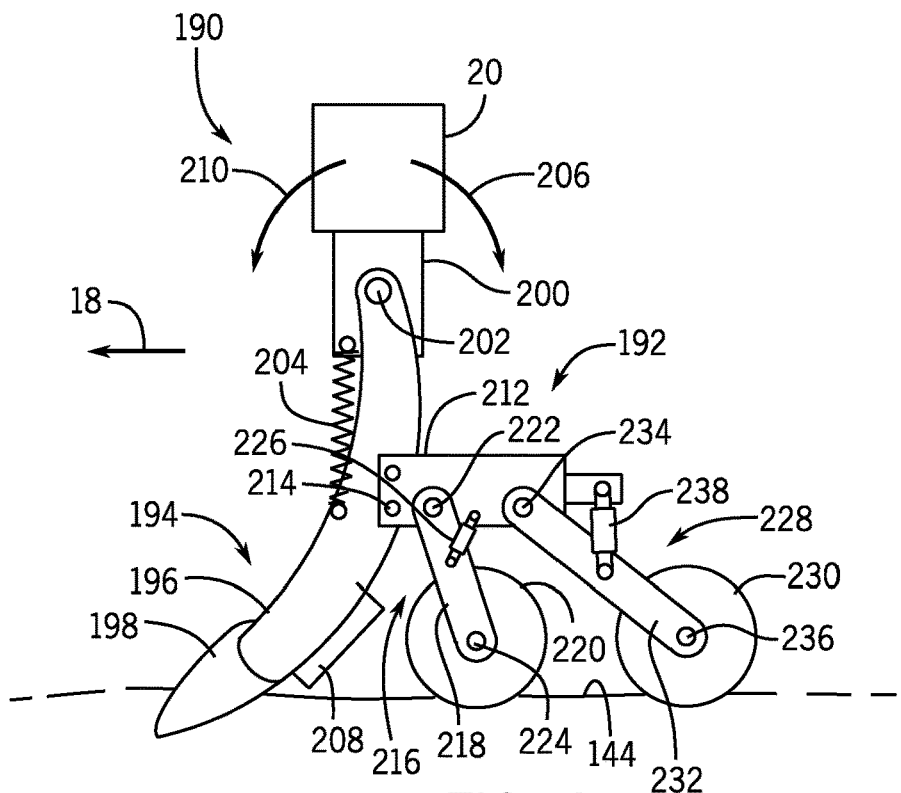
FIG. 4 is a side view of a further embodiment of a row unit that may be employed within the agricultural seeding implement of FIG. 1, in which the row unit has an embodiment of a closing system.

FIG. 4 is a side view of a further embodiment of a row unit 190 that may be employed within the agricultural seeding implement of FIG. 1, in which the row unit 190 has an embodiment of a closing system 192. In the illustrated embodiment, the row unit 190 includes an opener 194 having a shank 196 and a blade 198 rigidly coupled (e.g., non-movably coupled, non-rotatably coupled, non-translatably coupled, etc.) to the shank 196. The blade 198 may be rigidly coupled to the shank via any suitable connection system (e.g., fastener(s), a welded connection, press-fit connection, etc.), or the blade may be integrally formed with the shank (e.g., from a single piece of material). The shank 196 is movably (e.g., rotatably) coupled to the toolbar 20 of the agricultural seeding implement. In the illustrated embodiment, the shank 196 is pivotally coupled to the toolbar 20 via a bracket 200 and a pivot joint 202. The bracket 200 is rigidly coupled (e.g., non-movably coupled, non-rotatably coupled, non-translatably coupled, etc.) to the toolbar 20 via a suitable connection system (e.g., fastener(s), a welded connection, an adhesive connection, a press-fit connection, etc.), and the shank 196 is pivotally coupled to the bracket 200 via the pivot joint 202. While the shank is pivotally coupled to the toolbar via the bracket and the pivot joint in the illustrated embodiment, in other embodiments, the shank may be pivotally coupled to the toolbar via another suitable assembly (e.g., a linkage, multiple pivot joints, etc.). Furthermore, in certain embodiments, the shank may be translatably coupled to the toolbar via a suitable assembly (e.g., a linkage, a slide assembly, etc.), thereby enabling the shank to translate relative to the toolbar. In addition, in certain embodiments, the shank may be translatably and rotatably coupled to the toolbar via a suitable assembly, thereby enabling the shank to translate and rotate relative to the toolbar.

The row unit 190 includes a biasing member 204 configured to urge the blade 198 to engage the soil 144. In the illustrated embodiment, the biasing member includes a spring (e.g., coil spring). However, in other embodiments, the biasing member may include any other suitable device(s) (e.g., alone or in combination with the spring) to urge the blade to engage the soil. For example, the biasing member may include hydraulic cylinder(s), pneumatic cylinder(s), resilient member(s), spring(s), or a combination thereof. Furthermore, in the illustrated embodiment, the biasing member 204 extends from the bracket 200 to the shank 196 and is configured to urge the opener 194 to rotate in a first direction 206, thereby urging the blade 198 to engage the soil 144. However, in other embodiments, the biasing member may be connected to other suitable element(s), such as the blade and/or the toolbar. Furthermore, the biasing member may be positioned in front of the shank, as illustrated, or behind the shank along the direction of travel. In addition, if the opener is configured to translate relative to the toolbar, the biasing member may be configured to urge the opener to translate toward the soil and/or in the direction of travel 18 of the row unit.

In certain embodiments, the row unit may include an opener adjustment assembly configured to control the contact force between the blade and the soil. For example, the opener adjustment assembly may include a series of openings disposed along the shank and a pin coupled to an end of the biasing member. The pin may be engaged with a selected opening to control the torque applied by the biasing element to the shank, thereby controlling the contact force between the blade and the soil. In other embodiments, the opener adjustment assembly may include other and/or additional elements to control the contact force between the blade and the soil. For example, if the biasing member includes pneumatic cylinder(s) and/or hydraulic cylinder(s), the opener adjustment assembly may include a valve assembly configured to control fluid pressure within the pneumatic/hydraulic cylinder(s). The valve assembly may be communicatively coupled to a controller, such as the controller disclosed above with reference to FIG. 3. The controller may determine a target contact force between the blade and the soil based on soil condition(s), residue coverage, trench closing effectiveness, or a combination thereof. The controller may then control the pneumatic/hydraulic cylinder(s) via the valve assembly such that a determined contact force (e.g., as determined based on feedback from a contact force sensor, such as an opener position sensor, a strain gauge coupled to the opener, a torque sensor coupled to the opener, etc.) between the blade and the soil is within a threshold range of the target contact force. While pneumatic/hydraulic cylinder(s) are disclosed above, the biasing member may include another suitable type of pneumatic or hydraulic actuator (e.g., pneumatic or hydraulic motor, etc.), or the biasing member may include another suitable type of actuator (e.g., electric motor, linear actuator, etc.), which may be directly communicatively coupled to the controller.

The blade 198 is configured to form a trench within the soil 144, and a product tube 208 (e.g., seed tube) positioned behind the blade is configured to deposit agricultural product (e.g., seed, fertilizer, etc.) into the trench formed by the blade 198. In the illustrated embodiment, the product tube 208 is coupled to the shank 196 of the opener 194. However, in other embodiments, the product tube may be coupled to another suitable structure of the row unit (e.g., a frame of the closing system, etc.). The penetration depth of the blade into the soil may be controlled by adjusting the position of the toolbar relative to the surface of the soil. For example, the toolbars of the agricultural seeding implement may be supported by multiple wheels, and the positions of the wheels relative to the toolbars may be adjusted to control the positions of the toolbars relative to the soil surface, thereby controlling the penetration depth of the respective blades into the soil. In the illustrated embodiment, the opener 194 is configured to deflect in response to contact with an obstacle (e.g., within the soil, on the soil surface, etc.). As the row unit 190 moves in the direction of travel 18, contact between the blade 198 and an obstacle may drive the opener 194 to rotate in a second direction 210 about the pivot joint 202 against the force/torque of the biasing member 204, thereby causing the blade 198 to disengage the soil 144. After the opener 194 has cleared the obstacle (e.g., the row unit has moved past the obstacle), the force/torque provided by the biasing member 204 drives the opener to rotate in the first direction 206, thereby driving the blade 198 to re-engage the soil 144.

In the illustrated embodiment, the closing system 192 includes a frame 212 coupled to the shank 196 of the opener 194. In the illustrated embodiment, the frame 212 is rigidly coupled (e.g., non-movably coupled, non-rotatably coupled, non-translatably coupled, etc.) to the shank 196 via fasteners 214. However, in other embodiments, the frame may be rigidly coupled to the shank via another suitable connection system (e.g., a welded connection, an adhesive connection, a press-fit connection, etc.). Furthermore, in certain embodiments, the frame may be rigidly coupled to the blade via a suitable connection system. As discussed in detail below, the frame may be pivotally coupled to the opener in certain embodiments. In the illustrated embodiment, the frame 212 is only coupled to the toolbar 20 via the opener 194. Accordingly, the frame is not coupled to the toolbar by any structure that bypasses the opener. However, in other embodiments, the frame may be directly and rigidly coupled (e.g., non-movably coupled, non-rotatably coupled, non-translatably coupled, etc.) to the opener and movably coupled to the toolbar (e.g., by a linkage assembly, by a biasing element, etc.).

In addition, the closing system 192 includes a closing assembly 216 having a closing disc arm 218 and a closing disc 220 rotatably coupled to the closing disc arm 218. As illustrated, the closing disc arm 218 is pivotally coupled to the frame 212 at a pivot joint 222 (e.g., first pivot joint), and the closing disc arm 218 positions a rotational axis 224 of the closing disc 220 rearward of the blade 198 relative to the direction of travel 18 of the row unit 190. The closing disc 220 is configured to close the trench formed by the opener and/or to break up the side wall(s) of the trench, thereby enhancing the development of crops from the deposited seeds. In the illustrated embodiment, the closing disc 220 is substantially smooth. However, in other embodiments, the closing disc may be wavy and/or have multiple spikes extending radially outward from a central hub of the closing disc. Furthermore, in the illustrated embodiment, the closing assembly 216 has a single closing disc 220. However, in other embodiments, the closing assembly may have additional closing disc(s) (e.g., 1, 2, 3, 4, or more), such as multiple closing discs rotatably coupled to the closing disc arm. By way of example, a first pair of closing discs may be coupled to the frame of the row unit by a first arm, and a second pair of closing discs (e.g., positioned rearward of the first pair of closing discs) may be coupled to the frame of the row unit by a second arm.

The closing assembly 216 of the closing system 192 includes a closing disc actuator 226 coupled to the closing disc arm 218. The closing disc actuator 226 is configured to control a downforce applied by the closing disc 220 to the soil 144. In the illustrated embodiment, the closing disc actuator 226 is also coupled to the frame 212. However, in other embodiments, the closing disc actuator may be coupled to any other suitable structure of the row unit (e.g., the shank of the opener, the packer wheel arm, etc.). In the illustrated embodiment, the closing disc actuator 226 includes a fluid actuator (e.g., hydraulic cylinder, hydraulic motor, pneumatic motor, etc.). Accordingly, the downforce applied by the closing disc 220 to the soil 144 may be increased by increasing the fluid pressure within the fluid actuator, and the downforce applied by the closing disc 220 to the soil 144 may be decreased by decreasing the fluid pressure within the fluid actuator. Furthermore, in certain embodiments, the row unit may include a valve assembly fluidly coupled to the closing disc actuator (e.g., the fluid actuator). The valve assembly is configured to control the fluid pressure within the fluid actuator, thereby controlling the downforce applied by the closing disc to the soil. In addition, the controller, which is communicatively coupled to the valve assembly, such as the controller disclosed above with reference to FIG. 3, is configured to output an output signal to the valve assembly indicative of instructions to control the closing disc actuator.

While the closing disc actuator 226 includes the fluid actuator in the illustrated embodiment, in other embodiments, the closing disc actuator may include another or an alternative suitable actuating device, such as an electromechanical actuator, a linear actuator, or an electric motor. In such embodiments, the actuating device may be directly communicatively coupled to the controller. Furthermore, while the closing disc actuator includes a single actuating device (e.g., the fluid actuator) in the illustrated embodiment, in other embodiments, the closing disc actuator may include multiple actuating devices (e.g., of the same type or of different types).

In certain embodiments, the controller may determine a target contact force between the closing disc 220 and the soil 144 based on soil condition(s) (e.g., as determined based on feedback from soil sensor(s), such as the soil sensors disclosed above with reference to FIGS. 2-3), residue coverage (e.g., as determined based on feedback from residue sensor(s), such as the residue sensors disclosed above with reference to FIGS. 2-3), trench closing effectiveness (e.g., as determined based on feedback from closing effectiveness sensor(s), such as the closing effectiveness sensors disclosed above with reference to FIGS. 2-3), or a combination thereof. The controller may then control the closing disc actuator 226 such that a determined contact force between the closing disc and the soil is within a threshold range of the target contact force. In certain embodiments, the determined contact force may be determined based on feedback from downforce sensor(s), such as the downforce sensors disclosed above with reference to FIGS. 2-3 (e.g., a fluid pressure sensor disposed between the closing disc actuator and the respective valve assembly).

The closing system 192 also includes a packer assembly 228 having a packer wheel 230 and a packer wheel arm 232.

The packer wheel arm 232 is pivotally coupled to the frame 212 at a pivot joint 234 (e.g., second pivot joint), and the packer wheel 230 is rotatably coupled to the packer wheel arm 232. The packer wheel 230 is configured to pack soil on top of the deposited agricultural product (e.g., to facilitate development of the resulting agricultural crops). The contact surface of the packer wheel may have any suitable shape (e.g., v-shaped, flat, etc.) and/or any suitable tread pattern (e.g., chevron treads, etc.). In the illustrated embodiment, the packer wheel arm 232 and the closing disc arm 218 are configured to rotate independently of one another relative to the frame 212. Accordingly, rotation of the packer wheel arm (e.g., in response to contact between the packer wheel and an obstruction) does not directly affect rotation of the closing disc arm, and rotation of the closing disc arm (e.g., in response to contact between the closing disc and an obstruction) does not directly affect rotation of the packer wheel arm. In addition, independent rotation of the closing disc arm and the packer wheel arm enables the contact force between the closing disc 220 and the soil to be controlled substantially independently of the contact force between the packer wheel 230 and the soil.

In addition, the packer wheel arm 232 positions a rotational axis 236 of the packer wheel 230 rearward of the rotational axis 224 of the closing disc 220 (e.g., each closing disc) relative to the direction of travel 18 of the row unit 190. While the illustrated packer assembly includes a single packer wheel, in other embodiments, the packer assembly may include additional packer wheel(s) (e.g., distributed along the direction of travel and/or positioned side-by-side). In addition, the packer wheel (e.g., the rotational axis of the packer wheel) may be oriented at any suitable angle relative to the direction of travel and/or a vertical axis (e.g., to facilitate packing of the soil on top of the deposited agricultural product). In certain embodiments, the angle of the packer wheel (e.g., the rotational axis of the packer wheel) relative to the direction of travel and/or the vertical axis may be adjustable via a suitable adjustment mechanism. Furthermore, in the illustrated embodiment, the pivot joint 222 of the closing disc arm 218 is positioned forward of the pivot joint 234 of the packer wheel arm 232, such that the closing disc arm pivot joint is separated from the packer wheel arm pivot joint on the frame. However, in other embodiments, the closing disc arm pivot joint may be positioned rearward of the packer wheel arm pivot joint, or the packer wheel arm and the closing disc arm may utilize a common pivot joint.

The packer assembly 228 of the closing system 192 includes a packer wheel actuator 238 coupled to the packer wheel arm 232. The packer wheel actuator 238 is configured to control a downforce applied by the packer wheel 230 to the soil 144 (e.g., soil surface). In the illustrated embodiment, the packer wheel actuator 238 is also coupled to the frame 212 (e.g., via a bracket). However, in other embodiments, the packer wheel actuator may be coupled to any other suitable structure of the row unit (e.g., the shank of the opener, etc.). In the illustrated embodiment, the packer wheel actuator 238 includes a fluid actuator (e.g., hydraulic cylinder, hydraulic motor, pneumatic motor, etc.). Accordingly, the downforce applied by the packer wheel 230 to the soil 144 (e.g., soil surface) may be increased by increasing the fluid pressure within the fluid actuator, and the downforce applied by the packer wheel 230 to the soil 144 (e.g., soil surface) may be decreased by decreasing the fluid pressure within the fluid actuator. Furthermore, in certain embodiments, the row unit may include a valve assembly fluidly coupled to the packer wheel actuator. The valve assembly is configured to control the fluid pressure within the fluid actuator, thereby controlling the downforce applied by the packer wheel to the soil. In addition, the controller, which is communicatively coupled to the valve assembly, is configured to output an output signal to the valve assembly indicative of instructions to control the packer wheel actuator.

While the packer wheel actuator 238 includes the fluid actuator in the illustrated embodiment, in other embodiments, the packer wheel actuator may include another or an alternative suitable actuating device, such as an electromechanical actuator, a linear actuator, or an electric motor. In such embodiments, the actuating device may be directly communicatively coupled to the controller. Furthermore, while the packer wheel actuator includes a single actuating device (e.g., the fluid actuator) in the illustrated embodiment, in other embodiments, the packer wheel actuator may include multiple actuating devices (e.g., of the same type or of different types).

In certain embodiments, the controller may determine a target contact force between the packer wheel 230 and the soil 144 (e.g., soil surface) based on soil condition(s) (e.g., as determined based on feedback from soil sensor(s), such as the soil sensors disclosed above with reference to FIGS. 2-3), residue coverage (e.g., as determined based on feedback from residue sensor(s), such as the residue sensors disclosed above with reference to FIGS. 2-3), trench closing effectiveness (e.g., as determined based on feedback from closing effectiveness sensor(s), such as the closing effectiveness sensors disclosed above with reference to FIGS. 2-3), or a combination thereof. The controller may then control the packer wheel actuator 238 such that a determined contact force between the packer wheel and the soil is within a threshold range of the target contact force. In certain embodiments, the determined contact force may be determined based on feedback from downforce sensor(s), such as the downforce sensors disclosed above with reference to FIGS. 2-3 (e.g., a fluid pressure sensor disposed between the packer wheel actuator and the respective valve assembly).

Because the closing disc arm and the packer wheel arm are independently pivotally coupled to the frame, the contact force between the packer wheel and the soil (e.g., the soil surface) may be controlled substantially independently of the contact force between the closing disc and the soil. For example, the contact force between the closing disc and the soil may be adjusted to a first value via the closing disc actuator, and the contact force between the packer wheel and the soil may be adjusted to a second value via the packer wheel actuator. Each contact force may be adjusted for particular field conditions (e.g., soil composition, soil moisture, etc.). As a result, the closing system may be utilized to effectively close the trench and/or break up the side wall(s) of the trench for a variety of field conditions (e.g., as compared to utilizing a different closing system for different field conditions).

Furthermore, because the frame 212 is rigidly coupled to the opener 194 (e.g., to the shank 196 of the opener 194), the frame 212 and the elements coupled to the frame (e.g., the packer wheel arm, the packer wheel, the closing disc arm, the closing disc, etc.) move with the opener 194 as the opener deflects in response to contact with an obstacle/obstruction. Accordingly, in response to the opener 194 engaging an obstacle/obstruction, the opener, the closing disc, and the packer wheel may disengage the soil. After the opener 194 has cleared the obstacle/obstruction, the force/torque provided by the opener biasing element 204 may drive the opener/frame to rotate in the first direction 206, thereby driving the opener, the closing disc, and the packer wheel to re-engage the soil.

In the illustrated embodiment, the row unit 190 including the closing system 192 is a seeding/seeder row unit, as compared to a planting/planter row unit. Accordingly, a storage compartment (e.g., hopper, mini-hopper, etc.) for agricultural product is not non-movably coupled to the opener 194, and a storage compartment (e.g., hopper, mini-hopper, etc.) for agricultural product is not non-movably coupled to the frame 212. That is, an agricultural product storage compartment is not non-movably coupled to the opener or the frame (e.g., as compared to a planting/planter row unit that includes an agricultural product storage compartment, such as a hopper or a mini-hopper configured to receive agricultural product from a central storage compartment, non-movably coupled to the frame of the row unit). In addition, the seeding/seeder row unit 190 includes an opener 194 having a shank 196 and a blade 198 (e.g., as compared to a planting/planter row unit that includes a pair of opener discs). Furthermore, in the illustrated embodiment, a metering device is not non-movably coupled to the opener or the frame of the row unit (e.g., as compared to a planting/planter row unit that includes a frame-mounted metering device, such as a vacuum seed meter). However, in other embodiments, an agricultural product storage compartment may be non-movably coupled to the opener and/or to the frame of the row unit, and/or a metering device (e.g., seed meter) may be non-movably coupled to the opener and/or to the frame of the row unit.

Figure 5:
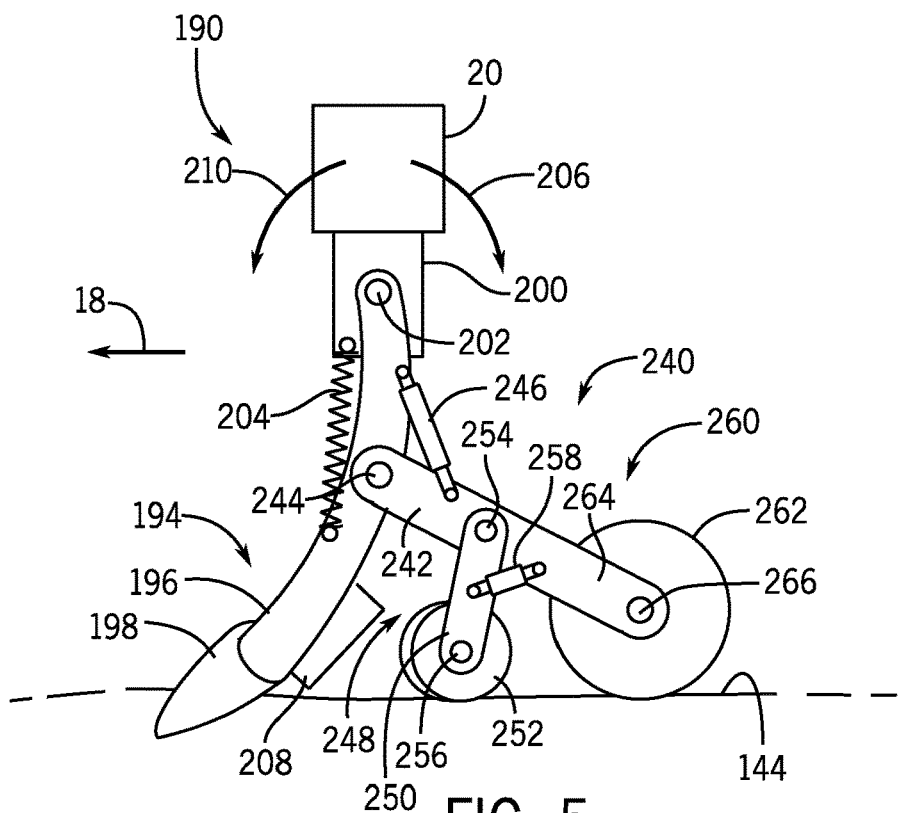
FIG. 5 is a side view of the row unit of FIG. 4, in which the row unit has another embodiment of a closing system.

FIG. 5 is a side view of the row unit 190 of FIG. 4, in which the row unit 190 has another embodiment of a closing system 240. The closing system 240 includes a frame 242 pivotally and, in certain embodiments, non-translatably coupled to the opener 194 at a pivot joint 244. In the illustrated embodiment, the frame 242 is pivotally coupled to the shank 196 of the opener 194 at the pivot joint 244. However, in other embodiments, the frame 242 may be pivotally coupled to the blade 198 of the opener 194 or another suitable portion of the opener. While the frame 242 is pivotally coupled to the opener 194 in the illustrated embodiment, in other embodiments, the frame may be rigidly coupled to the opener, as previously discussed with reference to FIG. 4. In the illustrated embodiment, the frame 242 is only coupled to the toolbar 20 via the opener 194. Accordingly, the frame is not coupled to the toolbar by any structure that bypasses the opener. However, in other embodiments, the frame may be directly pivotally and, in certain embodiments, non-translatably coupled to the opener and movably coupled to the toolbar (e.g., by a linkage assembly, by a biasing element, etc.).

In the illustrated embodiment, the closing system 240 includes a frame actuator 246 coupled to the frame 242 and to the opener 194. As discussed in detail below, the frame actuator 246 is configured to control a downforce applied by the packer wheel to the soil 144 (e.g., soil surface). While the frame actuator 246 is coupled to the shank 196 of the opener 194 in the illustrated embodiment, in other embodiments, the frame actuator may be coupled to the blade 198 of the opener 194 or to another suitable portion of the opener. In addition, in certain embodiments, the frame actuator may be coupled to the toolbar (e.g., via the bracket).

In addition, the closing system 240 includes a closing assembly 248 having a closing disc arm 250 and a pair of closing discs 252 rotatably coupled to the closing disc arm 250. As illustrated, the closing disc arm 250 is pivotally coupled to the frame 242 at a pivot joint 254, and the closing disc arm 250 positions a rotational axis 256 of each closing disc 252 rearward of the blade 198 relative to the direction of travel 18 of the row unit 190. The closing discs 252 are configured to close the trench formed by the opener and/or to break up the side wall(s) of the trench, thereby enhancing the development of crops resulting from the deposited seeds. In the illustrated embodiment, the closing discs 252 are substantially smooth. However, in other embodiments, at least one closing disc may be wavy and/or have multiple spikes extending radially outward from a central hub of the closing disc. Furthermore, while the closing assembly 248 has a pair of closing discs 252 in the illustrated embodiment, in other embodiments, the closing assembly may have more or fewer closing discs (e.g., 1, 2, 3, 4, or more), such as a single closing disc rotatably coupled to the closing disc arm. By way of example, a first pair of closing discs may be coupled to the frame of the row unit by a first arm, and a second pair of closing discs (e.g., positioned rearward of the first pair of closing discs) may be coupled to the frame of the row unit by a second arm.

The closing assembly 248 of the closing system 240 includes a closing disc actuator 258 coupled to the closing disc arm 250. The closing disc actuator 258 is configured to control a downforce applied by the closing discs 252 to the soil 144. In the illustrated embodiment, the closing disc actuator 258 is also coupled to the frame 242. However, in other embodiments, the closing disc actuator may be coupled to any other suitable structure of the row unit (e.g., the packer wheel arm, etc.). In the illustrated embodiment, the closing disc actuator 258 includes a fluid actuator (e.g., hydraulic cylinder, hydraulic motor, pneumatic motor, etc.). Accordingly, the downforce applied by the closing discs 252 to the soil 144 may be increased by increasing the fluid pressure within the fluid actuator, and the downforce applied by the closing discs 252 to the soil 144 may be decreased by decreasing the fluid pressure within the fluid actuator. Furthermore, in certain embodiments, the row unit may include a valve assembly fluidly coupled to the closing disc actuator. The valve assembly is configured to control the fluid pressure within the fluid actuator, thereby controlling the downforce applied by the closing discs to the soil. In addition, a controller, such as the controller disclosed above with reference to FIG. 3, is communicatively coupled to the valve assembly and configured to output an output signal to the valve assembly indicative of instructions to control the closing disc actuator.

While the closing disc actuator 258 includes the fluid actuator in the illustrated embodiment, in other embodiments, the closing disc actuator may include another or an alternative suitable actuating device, such as an electromechanical actuator, a linear actuator, or an electric motor. In such embodiments, the actuating device may be directly communicatively coupled to the controller. Furthermore, while the closing disc actuator includes a single actuating device (e.g., the fluid actuator) in the illustrated embodiment, in other embodiments, the closing disc actuator may include multiple actuating devices (e.g., of the same type or of different types).

In certain embodiments, the controller may determine a target contact force between the closing discs 252 and the soil 144 based on soil condition(s) (e.g., as determined based on feedback from soil sensor(s), such as the soil sensors disclosed above with reference to FIGS. 2-3), residue coverage (e.g., as determined based on feedback from residue sensor(s), such as the residue sensors disclosed above with reference to FIGS. 2-3), trench closing effectiveness (e.g., as determined based on feedback from closing effectiveness sensor(s), such as the closing effectiveness sensors disclosed above with reference to FIGS. 2-3), or a combination thereof. The controller may then control the closing disc actuator 258 such that a determined contact force between the closing discs and the soil is within a threshold range of the target contact force. In certain embodiments, the determined contact force may be determined based on feedback from downforce sensor(s), such as the downforce sensors disclosed above with reference to FIGS. 2-3 (e.g., a fluid pressure sensor disposed between the closing disc actuator and the respective valve assembly).

The closing system 240 also includes a packer assembly 260 having a packer wheel 262 and a packer wheel arm 264. In the illustrated embodiment, the packer wheel arm 264 is rigidly coupled (e.g., non-movably coupled, non-rotatably coupled, non-translatably coupled, etc.) to the frame 242, and the packer wheel 262 is rotatably coupled to the packer wheel arm 264. Because the packer wheel arm 264 is rigidly coupled to the frame 242, the frame actuator 246 controls the downforce applied by the packer wheel 262 to the soil 144 (e.g., soil surface). The packer wheel arm 264 may be rigidly coupled to the frame 242 by any suitable connection system (e.g., fastener(s), a welded connection, an adhesive connection, a press-fit connection, etc.). Furthermore, in certain embodiments, the packer wheel arm 264 and the frame 242 may be integrally formed (e.g., from a single piece of material). In addition, because the packer wheel arm is rigidly coupled to the frame, the frame actuator may be coupled to the packer wheel arm (e.g., instead of the frame), and/or the closing disc arm may be pivotally coupled to the packer wheel arm (e.g., instead of the frame). While the packer wheel arm is rigidly coupled to the frame in the illustrated embodiment, in other embodiments, the packer wheel arm may be pivotally coupled to the frame, and an actuator coupled to the packer wheel arm may control the contact force between the packer wheel and the soil (e.g., as discussed above with reference to FIG. 4). The packer wheel 262 is configured to pack soil on top of the deposited agricultural product (e.g., to facilitate development of the resulting agricultural crops). The contact surface of the packer wheel may have any suitable shape (e.g., v-shaped, flat, etc.) and/or any suitable tread pattern (e.g., chevron treads, etc.).

In addition, the packer wheel arm 264 positions a rotational axis 266 of the packer wheel 262 rearward of the rotational axis 256 of each closing disc 252 relative to the direction of travel 18 of the row unit 190. While the illustrated packer assembly includes a single packer wheel, in other embodiments, the packer assembly may include additional packer wheel(s) (e.g., distributed along the direction of travel and/or positioned side-by-side). In addition, the packer wheel (e.g., the rotational axis of the packer wheel) may be oriented at any suitable angle relative to the direction of travel and/or a vertical axis (e.g., to facilitate packing of the soil on top of the deposited agricultural product). In certain embodiments, the angle of the packer wheel (e.g., the rotational axis of the packer wheel) relative to the direction of travel and/or the vertical axis may be adjustable via a suitable adjustment mechanism.

In the illustrated embodiment, the frame actuator 246 includes a fluid actuator (e.g., hydraulic cylinder, hydraulic motor, pneumatic motor, etc.). Accordingly, the downforce applied by the packer wheel 262 to the soil 144 (e.g., soil surface) may be increased by increasing the fluid pressure within the fluid actuator, and the downforce applied by the packer wheel 262 to the soil 144 may be decreased by decreasing the fluid pressure within the fluid actuator. Furthermore, in certain embodiments, the row unit may include a valve assembly fluidly coupled to the fluid actuator. The valve assembly is configured to control the fluid pressure within the fluid actuator, thereby controlling the downforce applied by the packer wheel to the soil. In addition, the controller, which is communicatively coupled to the valve assembly, is configured to output an output signal to the valve assembly indicative of instructions to control the frame actuator.

While the frame actuator 246 includes the fluid actuator in the illustrated embodiment, in other embodiments, the frame actuator may include another or an alternative suitable actuating device, such as an electromechanical actuator, a linear actuator, or an electric motor. In such embodiments, the actuating device may be directly communicatively coupled to the controller. Furthermore, while the frame actuator includes a single actuating device (e.g., the fluid actuator) in the illustrated embodiment, in other embodiments, the frame actuator may include multiple actuating devices (e.g., of the same type or of different types).

In certain embodiments, the controller may determine a target contact force between the packer wheel 262 and the soil 144 (e.g., soil surface) based on soil condition(s) (e.g., as determined based on feedback from soil sensor(s), such as the soil sensors disclosed above with reference to FIGS. 2-3), residue coverage (e.g., as determined based on feedback from residue sensor(s), such as the residue sensors disclosed above with reference to FIGS. 2-3), trench closing effectiveness (e.g., as determined based on feedback from closing effectiveness sensor(s), such as the closing effectiveness sensors disclosed above with reference to FIGS. 2-3), or a combination thereof. The controller may then control the frame actuator 246 such that a determined contact force between the packer wheel and the soil is within a threshold range of the target contact force. In certain embodiments, the determined contact force may be determined based on feedback from downforce sensor(s), such as the downforce sensors disclosed above with reference to FIGS. 2-3 (e.g., a fluid pressure sensor disposed between the fluid actuator and the respective valve assembly).

Because the closing disc arm is pivotally coupled to the frame, the contact force between the closing discs and the soil may be controlled substantially independently of the contact force between the packer wheel and the soil (e.g., the soil surface). For example, the contact force between the packer wheel and the soil may be adjusted to a first value via the frame actuator, and the contact force between the closing discs and the soil may be adjusted to a second value via the closing disc actuator. Each contact force may be adjusted for particular field conditions (e.g., soil composition, soil moisture, etc.). As a result, the closing system may be utilized to effectively close the trench and/or to break up the side wall(s) of the trench for a variety of field conditions (e.g., as compared to utilizing a different closing system for different field conditions). While the closing system includes the frame actuator in the illustrated embodiment, in other embodiments, biasing member(s) (e.g., spring(s), pneumatic cylinder(s), piece(s) of resilient material, etc.) may be used to urge the frame downwardly relative to the opener (e.g., instead of the frame actuator). In such embodiments, the packer wheel arm may be pivotally coupled to the frame, and an actuator coupled to the packer wheel arm may control the contact force between the packer wheel and the soil.

Furthermore, in certain embodiments, the closing system may include a stop coupled to the opener (e.g., to the shank of the opener) and configured to block downward rotation of the frame beyond a threshold position. In such embodiments, due to contact between the frame and the stop, the frame and the elements coupled to the frame (e.g., the packer wheel arm, the packer wheel, the closing disc arm, the closing disc, etc.) may move with the opener as the opener deflects in response to contact with an obstacle/obstruction. Accordingly, in response to the opener engaging an obstacle/obstruction, the opener, the closing discs, and the packer wheel may disengage the soil. After the opener has cleared the obstacle/obstruction, the force/torque provided by the opener biasing element may drive the opener to rotate in the first direction, thereby driving the opener to re-engaging the soil, and the force/torque provided by the frame actuator may drive the closing discs and the packer wheel to re-engage the soil.

In the illustrated embodiment, the row unit 190 including the closing system 240 is a seeding/seeder row unit, as compared to a planting/planter row unit. Accordingly, a storage compartment (e.g., hopper, mini-hopper, etc.) for agricultural product is not non-movably coupled to the opener 194, and a storage compartment (e.g., hopper, mini-hopper, etc.) for agricultural product is not non-movably coupled to the frame 242. That is, an agricultural product storage compartment is not non-movably coupled to the opener or the frame (e.g., as compared to a planting/planter row unit that includes an agricultural product storage compartment, such as a hopper or a mini-hopper configured to receive agricultural product from a central storage compartment, non-movably coupled to the frame of the row unit). In addition, the seeding/seeder row unit 190 includes an opener 194 having a shank 196 and a blade 198 (e.g., as compared to a planting/planter row unit that includes a pair of opener discs). Furthermore, in the illustrated embodiment, a metering device is not non-movably coupled to the opener or the frame of the row unit (e.g., as compared to a planting/planter row unit that includes a frame-mounted metering device, such as a vacuum seed meter). However, in other embodiments, an agricultural product storage compartment may be non-movably coupled to the opener or the frame of the row unit, and/or a metering device (e.g., seed meter) may be non-movably coupled to the opener or the frame of the row unit.

Figure 6:
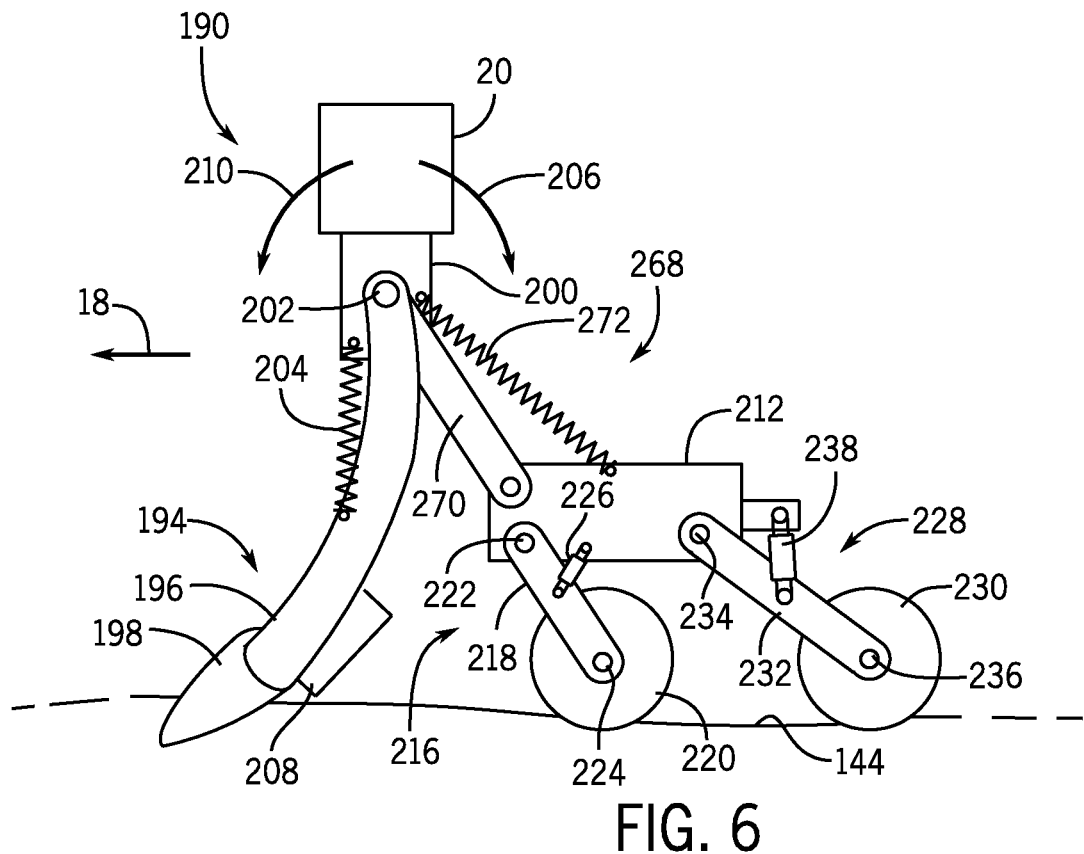
FIG. 6 is a side view of the row unit of FIG. 4, in which the row unit has a further embodiment of a closing system.

FIG. 6 is a side view of the row unit 190 of FIG. 4, in which the row unit 190 has a further embodiment of a closing system 268. The closing system 268 includes a closing system arm 270 movably (e.g., rotatably) coupled to the toolbar 20 of the agricultural seeding implement. In the illustrated embodiment, the closing system arm 270 is pivotally coupled to the toolbar 20 via the bracket 200 and the pivot joint 202. As previously discussed, the bracket 200 is rigidly coupled (e.g., non-movably coupled, non-rotatably coupled, non-translatably coupled, etc.) to the toolbar 20, and the closing system arm 270 is pivotally coupled to the bracket 200 via the pivot joint 202. In the illustrated embodiment, the closing system arm 270 is pivotally coupled to the bracket 200 by the same pivot joint 202 as the shank 196 of the opener 194. However, as discussed in detail below, the closing system arm may be pivotally coupled to the bracket by another pivot joint (e.g., remote from the opener pivot joint). Furthermore, while the closing system arm is pivotally coupled to the toolbar via the bracket and the pivot joint in the illustrated embodiment, in other embodiments, the closing system arm may be pivotally coupled to the toolbar via another suitable assembly (e.g., a linkage, multiple pivot joints, etc.). In addition, in certain embodiments, the closing system arm may be translatably coupled to the toolbar via a suitable assembly (e.g., a linkage, a slide assembly, etc.), thereby enabling the closing system arm to translate relative to the toolbar. In addition, the closing system arm may be translatably and rotatably coupled to the toolbar via a suitable assembly, thereby enabling the closing system arm to translate and rotate relative to the toolbar.

In addition, the closing system 268 includes the frame 212, as discussed above with reference to FIG. 4, and the closing system arm 270 is rigidly coupled (e.g., non-movably coupled, non-rotatably coupled, non-translatably coupled, etc.) to the frame 212. In the illustrated embodiment, the closing system 268 includes a frame biasing element 272 coupled to the frame 212 and to the bracket 200. The frame biasing element 272 is configured to urge the frame 212 downwardly relative to the toolbar 20. In the illustrated embodiment, the frame biasing element 272 includes a single coil spring. However, in other embodiments, the frame biasing element may include an alternative biasing device and/or additional biasing device(s) (e.g., leaf spring(s), pneumatic cylinder(s), hydraulic cylinder(s), resilient member(s), etc.) configured to urge the frame downwardly relative to the toolbar. Furthermore, while the frame biasing element 272 is coupled to the bracket 200 in the illustrated embodiment, in other embodiments, the frame biasing element may be coupled to the toolbar or to another suitable element rigidly coupled to the toolbar.

In certain embodiments, the closing system may include a frame adjustment assembly configured to control the downward force applied to the frame. For example, the frame adjustment assembly may include a series of openings disposed along the frame and a pin coupled to an end of the frame biasing element. The pin may be engaged with a selected opening to control the downward force applied by the frame biasing element to the frame. In other embodiments, the frame adjustment assembly may include other and/or additional elements to control the downward force. For example, if the biasing device(s) include pneumatic cylinder(s) and/or hydraulic cylinder(s), the frame adjustment assembly may include a valve assembly configured to control fluid pressure within the pneumatic/hydraulic cylinder(s). The valve assembly may be communicatively coupled to a controller, such as the controller disclosed above with reference to FIG. 3, and the controller may control the pneumatic/hydraulic cylinder(s) via the valve assembly to control the contact force between the closing disc and the soil and the contact force between the packer wheel and the soil. While pneumatic/hydraulic cylinder(s) are disclosed above, the biasing device(s) may include another suitable type of pneumatic or hydraulic actuator (e.g., pneumatic or hydraulic motor, etc.), or the biasing device(s) may include another suitable type of actuator (e.g., electric motor, linear actuator, etc.), which may be directly communicatively coupled to the controller.

In the illustrated embodiment, the closing system 268 includes the closing disc arm 218 pivotally coupled to the frame 212 and closing disc(s) 220 rotatably coupled to the closing disc arm 218. The closing disc arm 218 positions the rotational axis 224 of each closing disc 220 rearward of the blade 198 of the opener 194 relative to the direction of travel 18 of the row unit 190. In addition, the closing system 268 includes the packer wheel arm 232 pivotally coupled to the frame 212 and the packer wheel 230 rotatably coupled to the packer wheel arm. The packer wheel arm 232 positions the rotational axis 236 of the packer wheel 230 rearward of the rotational axis 224 of each closing disc 220 relative to the direction of travel 18 of the row unit 190. Furthermore, the closing system 268 includes the packer wheel actuator 238 coupled to the packer wheel arm 232 and configured to control the downforce applied by the packer wheel 230 to the soil, and the closing system 268 includes the closing disc actuator 226 coupled to the closing disc arm 218 and configured to control the downforce applied by each closing disc 220 to the soil.

Each of the functions and/or structures of the frame 212, the closing assembly 216, the closing disc arm 218, the closing disc(s) 220, the closing disc actuator 226, the packer assembly 228, the packer wheel 230, the packer wheel arm 232, and the packer wheel actuator 238 disclosed above with reference to FIG. 4 may apply to the respective elements of the illustrated embodiment. Furthermore, any of the variations of the frame 212, the closing assembly 216, the closing disc arm 218, the closing disc(s) 220, the closing disc actuator 226, the packer assembly 228, the packer wheel 230, the packer wheel arm 232, and the packer wheel actuator 238 disclosed above with reference to FIG. 4 may apply to the respective elements of the illustrated embodiment. In addition, the closing system 268 may include the controller and/or the valve assembly/assemblies, as disclosed above with reference to FIG. 4, to control the actuators (e.g., using the techniques/sensors disclosed above with reference to FIG. 4). In embodiments in which the biasing device(s) of the frame biasing element include frame actuator(s) (e.g., pneumatic/hydraulic cylinder(s), etc.), the controller may control the frame actuator(s), the closing disc actuator 226, and the packer wheel actuator 238. For example, the controller may determine a first target contact force between the closing disc(s) and the soil and a second target contact force between the packer wheel and the soil based on soil condition(s), residue coverage, trench closing effectiveness, or a combination thereof. The controller may then control the frame actuator(s), the closing disc actuator, and the packer wheel actuator such that a first determined contact force between the closing disc(s) and the soil is within a threshold range of the first target contact force, and a second determined contact force between the packer wheel and the soil is within a threshold range of the second target contact force. In certain embodiments, the determined contact forces may be determined based on feedback from downforce sensor(s), such as the downforce sensors disclosed above with reference to FIGS. 2-3 (e.g., a fluid pressure sensor disposed between the closing disc actuator and the respective valve assembly, a fluid pressure sensor disposed between the packer wheel actuator and the respective valve assembly, etc.).

In certain embodiments, a linkage assembly may extend between the opener (e.g., the shank of the opener) and the frame/closing system arm. The linkage assembly may enable the opener to freely rotate through a range of motion in response to engagement of the opener (e.g., the blade of the opener) with an obstacle/obstruction. In addition, if the opener rotates beyond the range of motion in response to engagement with the obstacle/obstruction, the linkage assembly may drive the frame to rotate about the pivot joint. Accordingly, in response to the opener engaging certain obstacles/obstructions, the opener, the closing disc(s), and the packer wheel may disengage the soil. After the opener has cleared the obstacle/obstruction, the force/torque provided by the opener biasing element may drive the opener to rotate in the first direction, thereby driving the opener to re-engaging the soil, and the force/torque provided by the frame biasing element (e.g., spring, pneumatic/hydraulic cylinder(s), etc.) may drive the closing disc(s) and the packer wheel to re-engage the soil. By way of example, the linkage assembly may include a bar having a slot, in which the bar is coupled to the frame. In addition, the linkage assembly may include a pin coupled to the opener and disposed within the slot. The length of the slot may be selected to enable the opener to freely rotate through the range of motion before driving the frame to move.

In the illustrated embodiment, the row unit 190 including the closing system 268 is a seeding/seeder row unit, as compared to a planting/planter row unit. Accordingly, a storage compartment (e.g., hopper, mini-hopper, etc.) for agricultural product is not non-movably coupled to the opener 194, and a storage compartment (e.g., hopper, mini-hopper, etc.) for agricultural product is not non-movably coupled to the frame 212. That is, an agricultural product storage compartment is not non-movably coupled to the opener or the frame (e.g., as compared to a planting/planter row unit that includes an agricultural product storage compartment, such as a hopper or a mini-hopper configured to receive agricultural product from a central storage compartment, non-movably coupled to the frame of the row unit). In addition, the seeding/seeder row unit 190 includes an opener 194 having a shank 168 and a blade 198 (e.g., as compared to a planting/planter row unit that includes a pair of opener discs). Furthermore, in the illustrated embodiment, a metering device is not non-movably coupled to the opener or the frame of the row unit (e.g., as compared to a planting/planter row unit that includes a frame-mounted metering device, such as a vacuum seed meter). However, in other embodiments, an agricultural product storage compartment may be non-movably coupled to the opener or the frame of the row unit, and/or a metering device (e.g., seed meter) may be non-movably coupled to the opener or the frame of the row unit.

Figure 7:
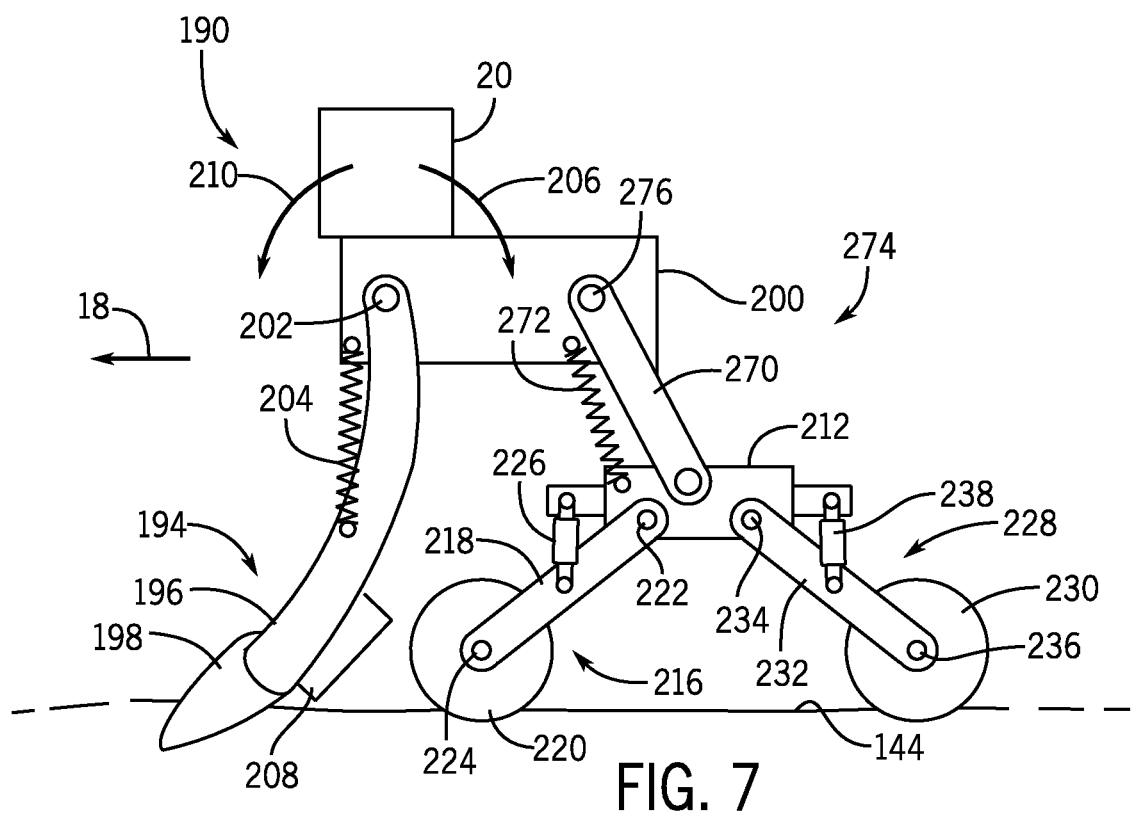
FIG. 7 is a side view of the row unit of FIG. 4, in which the row unit has another embodiment of a closing system.

FIG. 7 is a side view of the row unit 190 of FIG. 4, in which the row unit 190 has another embodiment of a closing system 274. In the illustrated embodiment, the closing system 274 includes the closing system arm 270 movably (e.g., rotatably) coupled to the toolbar 20 of the agricultural seeding implement. In the illustrated embodiment, the closing system arm 270 is pivotally coupled to the toolbar 20 via the bracket 200 and a second pivot joint 276. As previously discussed, the bracket 200 is rigidly coupled (e.g., non-movably coupled, non-rotatably coupled, non-translatably coupled, etc.) to the toolbar 20, and the closing system arm 270 is pivotally coupled to the bracket 200 via the second pivot joint 276. In the illustrated embodiment, the second pivot joint 276 is positioned remote from the opener/shank pivot joint 202. However, as previously discussed, the closing system arm and the shank may be pivotally coupled to the bracket by the same pivot joint. Furthermore, while the closing system arm is pivotally coupled to the toolbar via the bracket and the pivot joint in the illustrated embodiment, in other embodiments, the closing system arm may be pivotally coupled to the toolbar via another suitable assembly (e.g., a linkage, multiple pivot joints, etc.). In addition, in certain embodiments, the closing system arm may be translatably coupled to the toolbar via a suitable assembly (e.g., a linkage, a slide assembly, etc.), thereby enabling the closing system arm to translate relative to the toolbar. In addition, the closing system arm may be translatably and rotatably coupled to the toolbar via a suitable assembly, thereby enabling the closing system arm to translate and rotate relative to the toolbar.

In addition, the closing system 274 includes the frame 212, as discussed above with reference to FIG. 4, and the closing system arm 270 is rigidly coupled (e.g., non-movably coupled, non-rotatably coupled, non-translatably coupled, etc.) to the frame 212. In the illustrated embodiment, the closing system 274 includes the frame biasing element 272 coupled to the frame 212 and to the bracket 200.

The frame biasing element 272 is configured to urge the frame 212 downwardly relative to the toolbar 20. In the illustrated embodiment, the frame biasing element 272 includes a single coil spring. However, in other embodiments, the frame biasing element may include an alternative biasing device and/or additional biasing device(s) (e.g., leaf spring(s), pneumatic cylinder(s), hydraulic cylinder(s), resilient member(s), etc.) configured to urge the frame downwardly relative to the toolbar. Furthermore, while the frame biasing element 272 is coupled to the bracket 200 in the illustrated embodiment, in other embodiments, the frame biasing element may be coupled to the toolbar or to another suitable element rigidly coupled to the toolbar.

In certain embodiments, the closing system may include a frame adjustment assembly configured to control the downward force applied to the frame. For example, the frame adjustment assembly may include a series of openings disposed along the frame and a pin coupled to an end of the frame biasing element. The pin may be engaged with a selected opening to control the downward force applied by the frame biasing element to the frame. In other embodiments, the frame adjustment assembly may include other and/or additional elements to control the downward force. For example, if the biasing device(s) include pneumatic cylinder(s) and/or hydraulic cylinder(s), the frame adjustment assembly may include a valve assembly configured to control fluid pressure within the pneumatic/hydraulic cylinder(s). The valve assembly may be communicatively coupled to a controller, such as the controller disclosed above with reference to FIG. 3, and the controller may control the pneumatic/hydraulic cylinder(s) via the valve assembly to control the contact force between the closing disc(s) and the soil and the contact force between the packer wheel and the soil. While pneumatic/hydraulic cylinder(s) are disclosed above, the biasing device(s) may include another suitable type of pneumatic or hydraulic actuator (e.g., pneumatic or hydraulic motor, etc.), or the biasing device(s) may include another suitable type of actuator (e.g., electric motor, linear actuator, etc.), which may be directly communicatively coupled to the controller.

In the illustrated embodiment, the closing system 274 includes the closing disc arm 218 pivotally coupled to the frame 212 and closing disc(s) 220 rotatably coupled to the closing disc arm 218. The closing disc arm 218 positions the rotational axis 224 of each closing disc 220 rearward of the blade 198 of the opener 194 relative to the direction of travel 18 of the row unit 190. In addition, the closing system 274 includes the packer wheel arm 232 pivotally coupled to the frame 212 and the packer wheel 230 rotatably coupled to the packer wheel arm. The packer wheel arm 232 positions the rotational axis 236 of the packer wheel 230 rearward of the rotational axis 224 of each closing disc 220 relative to the direction of travel 18 of the row unit 190. Furthermore, the closing system 274 includes the packer wheel actuator 238 coupled to the packer wheel arm 232 and configured to control the downforce applied by the packer wheel 230 to the soil, and the closing system 274 includes the closing disc actuator 226 coupled to the closing disc arm 218 and configured to control the downforce applied by each closing disc 220 to the soil.

Each of the functions and/or structures of the frame 212, the closing assembly 216, the closing disc arm 218, the closing disc(s) 220, the closing disc actuator 226, the packer assembly 228, the packer wheel 230, the packer wheel arm 232, and the packer wheel actuator 238 disclosed above with reference to FIG. 4 may apply to the respective elements of the illustrated embodiment. Furthermore, any of the variations of the frame 212, the closing assembly 216, the closing disc arm 218, the closing disc(s) 220, the closing disc actuator 226, the packer assembly 228, the packer wheel 230, the packer wheel arm 232, and the packer wheel actuator 238 disclosed above with reference to FIG. 4 may apply to the respective elements of the illustrated embodiment. In addition, the closing system 274 may include the controller and/or the valve assembly/assemblies, as disclosed above with reference to FIG. 4, to control the actuators (e.g., using the techniques/sensors disclosed above with reference to FIG. 4). In embodiments in which the biasing device(s) of the frame biasing element include frame actuator(s) (e.g., pneumatic/hydraulic cylinder(s), etc.), the controller may control the frame actuator(s), the closing disc actuator 226, and the packer wheel actuator 238. For example, the controller may determine a first target contact force between the closing disc(s) and the soil and a second target contact force between the packer wheel and the soil based on soil condition(s), residue coverage, trench closing effectiveness, or a combination thereof. The controller may then control the frame actuator(s), the closing disc actuator, and the packer wheel actuator such that a first determined contact force between the closing disc(s) and the soil is within a threshold range of the first target contact force, and a second determined contact force between the packer wheel and the soil is within a threshold range of the second target contact force. In certain embodiments, the determined contact forces may be determined based on feedback from downforce sensor(s), such as the downforce sensors disclosed above with reference to FIGS. 2-3 (e.g., a fluid pressure sensor disposed between the closing disc actuator and the respective valve assembly, a fluid pressure sensor disposed between the packer wheel actuator and the respective valve assembly, etc.).

In certain embodiments, a linkage assembly may extend between the opener (e.g., the shank of the opener) and the frame/closing system arm. The linkage assembly may enable the opener to freely rotate through a range of motion in response to engagement of the opener (e.g., the blade of the opener) with an obstacle/obstruction. In addition, if the opener rotates beyond the range of motion in response to engagement with the obstacle/obstruction, the linkage assembly may drive the frame to rotate about the respective pivot joint. Accordingly, in response to the opener engaging certain obstacles/obstructions, the opener, the closing disc, and the packer wheel may disengage the soil. After the opener has cleared the obstacle/obstruction, the force/torque provided by the opener biasing element may drive the opener to rotate in the first direction, thereby driving the opener to re-engaging the soil, and the force/torque provided by the frame biasing element (e.g., spring, pneumatic/hydraulic cylinder(s), etc.) may drive the closing disc(s) and the packer wheel to re-engage the soil. By way of example, the linkage assembly may include a bar having a slot, in which the bar is coupled to the frame. In addition, the linkage assembly may include a pin coupled to the opener and disposed within the slot. The length of the slot may be selected to enable the opener to freely rotate through the range of motion before driving the frame to move.

In the illustrated embodiment, the row unit 190 including the closing system 274 is a seeding/seeder row unit, as compared to a planting/planter row unit. Accordingly, a storage compartment (e.g., hopper, mini-hopper, etc.) for agricultural product is not non-movably coupled to the opener 194, and a storage compartment (e.g., hopper, mini-hopper, etc.) for agricultural product is not non-movably coupled to the frame 212. That is, an agricultural product storage compartment is not non-movably coupled to the opener or the frame (e.g., as compared to a planting/planter row unit that includes an agricultural product storage compartment, such as a hopper or a mini-hopper configured to receive agricultural product from a central storage compartment, non-movably coupled to the frame of the row unit). In addition, the seeding/seeder row unit 190 includes an opener 194 having a shank 196 and a blade 198 (e.g., as compared to a planting/planter row unit that includes a pair of opener discs). Furthermore, in the illustrated embodiment, a metering device is not non-movably coupled to the opener or the frame of the row unit (e.g., as compared to a planting/planter row unit that includes a frame-mounted metering device, such as a vacuum seed meter). However, in other embodiments, an agricultural product storage compartment may be non-movably coupled to the opener or the frame of the row unit, and/or a metering device (e.g., seed meter) may be non-movably coupled to the opener or the frame of the row unit.

While the closing system includes a closing system arm 270 rigidly coupled to the frame 212 in the embodiments disclosed above with referenced to FIGS. 6-7, in other embodiments, the closing system arm may be pivotally coupled to the frame. For example, in certain embodiments, the closing system arm may be a link of a linkage assembly (e.g., having one or more other links pivotally coupled to the bracket/toolbar and the frame). The linkage assembly may control movement of the frame relative to the tool bar. In addition, the frame biasing element may urge the frame downwardly relative to the toolbar.

While the row units disclosed above with reference to FIGS. 3-7 include a single opener, in other embodiments, at least one row unit may include multiple openers (e.g., 2, 3, 4, or more). For example, with regard to the embodiment of the row unit disclosed above with reference to FIG. 3, a second opener (e.g., including a shank and a blade) may be coupled (e.g., non-translatably and pivotally coupled, non-translatably and non-pivotally coupled, translatably and pivotally coupled, or translatably and non-pivotally coupled) to the packer wheel arm. An agricultural product tube (e.g., coupled to the second opener) may be configured to deposit agricultural product within a second trench formed by the second opener and, in certain embodiments, the closing disc(s) may be configured to close the second trench/break up the side wall(s), and/or the packer wheel may be configured to pack soil on top of the deposited agricultural product. Furthermore, with regard to the embodiments of the row units disclosed above with reference to FIGS. 4-7, a second opener may be coupled (e.g., non-translatably and pivotally coupled, non-translatably and non-pivotally coupled, translatably and pivotally coupled, or translatably and non-pivotally coupled) to the tool bar (e.g., via the bracket 104). The second opener may be positioned in front of the first opener along the direction of travel. An agricultural product tube (e.g., coupled to the second opener) may be configured to deposit agricultural product within a second trench formed by the second opener and, in certain embodiments, the closing disc(s) may be configured to close the second trench/break up the side wall(s), and/or the packer wheel may be configured to pack soil on top of the deposited agricultural product.

In the embodiments disclosed above with reference to FIGS. 2-7, the controller may control the actuator(s) based on feedback from the downforce sensor(s), the soil sensor, the residue sensor, the closing effectiveness sensor, other suitable sensor(s), or a combination thereof. However, in other embodiments, the controller may control the actuator(s) based on feedback from other suitable sources (e.g., alone or in combination with the feedback from the sensors). For example, in certain embodiments, the seeding implement may include a spatial locating device (e.g., a global positioning system receiver, etc.) configured to output a signal indicative of the position of the seeding implement. In such embodiments, the controller may be configured to determine the position of the seeding implement based on the feedback from the spatial locating device, and control the actuator(s) based on the position of the seeding implement and a map (e.g., yield map, residue map, soil moisture map, etc.) of the field.

While certain embodiments of the row units disclosed above with reference to FIGS. 2-7 include multiple actuators (e.g., to control the contact force between the closing disc(s) and the soil, to control the contact force between the packer wheel and the soil, etc.), at least one row unit of the embodiments disclosed above may have fewer actuators. For example, at least one actuator of at least one row unit of the embodiments disclosed above may be replaced with a biasing element, and in certain embodiments a force/torque adjustment device configured to control the force/torque applied by the biasing element. In addition, in certain embodiments, one of the closing disc(s) or the packer wheel may be omitted from at least one row unit of the embodiments disclosed above with reference to FIGS. 2-7. In such embodiments, the respective actuator may be omitted, and the remaining actuator(s) may be controlled by the components and techniques disclosed above.

Furthermore, in certain embodiments disclosed above with reference to FIGS. 2-7, the controller is configured to control the contact force applied by the closing disc(s) to the soil and the contact force applied by the packer wheel to the soil. In such embodiments, the controller may control the contact forces independently of one another, or based on a relationship between the closing disc contact force and the packer wheel contact force. For example, a relationship between target contact forces (e.g., one target contact force may be a certain percentage greater than the other target contact force, etc.) may be stored within the memory of the controller, determined based on feedback from the sensors, determined via an empirical formula, or a combination thereof. The controller may determine the target contact forces based on the relationship and, in certain embodiments, feedback from the sensors. The controller may then control the closing disc actuator and the packer wheel actuator based on the target contact forces.

In addition, while controlling the contact force between the closing disc(s) and the soil and the contact force between the packer wheel and the soil is disclosed above with reference to the embodiments of FIGS. 2-7, in other embodiments, the techniques and components (e.g., sensor(s), actuator(s), valve assemblies, etc.) disclosed herein may be used to control the closing disc contact force and/or the packer wheel contact force of other suitable seeding/seeder systems. For example, in certain embodiments, closing disc(s) and/or a packer wheel may be positioned behind a row unit having an opener. In such embodiments, the techniques and components disclosed herein may be used to control the contact force of the closing disc(s) and/or the contact force of the packer wheel.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A row unit of a seeder comprising:
   a frame configured to be coupled to a toolbar of the seeder;
   a single opener disc rotatably coupled to the frame;
   a closing system, comprising:
     a closing disc arm pivotally coupled to the frame;
     a closing disc rotatably coupled to the closing disc arm, wherein the closing disc arm positions a rotational axis of the closing disc rearward of a rotational axis of the single opener disc relative to a direction of travel of the row unit;
     a closing disc actuator coupled to the closing disc arm, wherein the closing disc actuator is configured to control a first downforce applied by the closing disc to soil;
     a packer wheel arm pivotally coupled to the frame, wherein the packer wheel arm and the closing disc arm are configured to rotate independently of one another relative to the frame;
     a packer wheel rotatably coupled to the packer wheel arm, wherein the packer wheel arm positions a rotational axis of the packer wheel rearward of the rotational axis of the closing disc relative to the direction of travel of the row unit; and
     a packer wheel actuator coupled to the frame and to the packer wheel arm, wherein the packer wheel actuator is configured to control a second downforce applied by the packer wheel to the soil;
   wherein an agricultural product storage compartment is not non-movably coupled to the frame.

2. The row unit of claim 1, wherein the closing system comprises a controller configured to output a first output signal indicative of instructions to control the closing disc actuator and to output a second signal indicative of instructions to control the packer wheel actuator.

3. The row unit of claim 2, wherein the closing disc actuator comprises a first fluid actuator, and the packer wheel actuator comprises a second fluid actuator.

4. The row unit of claim 3, wherein the closing system comprises:
   a first valve assembly communicatively coupled to the controller and configured to control fluid pressure within the first fluid actuator; and
   a second valve assembly communicatively coupled to the controller and configured to control fluid pressure within the second fluid actuator;
   wherein the controller is configured to output the first output signal to the first valve assembly and to output the second output signal to the second valve assembly.

5. The row unit of claim 2, wherein the controller is configured to determine the instructions to control the closing disc actuator based at least in part on a first determined contact force between the closing disc and the soil, the controller is configured to determine the instructions to control the packer wheel actuator based at least in part on a second determined contact force between the packer wheel and the soil, or a combination thereof.

6. The row unit of claim 5, wherein the closing system comprises:
a first downforce sensor communicatively coupled to the controller and configured to output a first input signal indicative of the first determined contact force; and
a second downforce sensor communicatively coupled to the controller and configured to output a second input signal indicative of the second determined contact force.

7. The row unit of claim 2, wherein the controller is configured to determine the instructions to control the closing disc actuator, to determine the instructions to control the packer wheel actuator, or a combination thereof, based at least in part on a measured soil condition.

8. The row unit of claim 7, wherein the closing system comprises a soil sensor communicatively coupled to the controller and configured to output a third input signal indicative of the measured soil condition.

9. A row unit of a seeder comprising:
a frame configured to be coupled to a toolbar of the seeder;
a single opener disc rotatably coupled to the frame;
a closing system, comprising:
a closing disc arm pivotally coupled to the frame;
a closing disc rotatably coupled to the closing disc arm;
a closing disc actuator coupled to the closing disc arm, wherein the closing disc actuator is configured to control a first downforce applied by the closing disc to soil;
a packer wheel arm pivotally coupled to the frame, wherein the packer wheel arm and the closing disc arm are configured to rotate independently of one another relative to the frame;
a packer wheel rotatably coupled to the packer wheel arm;
a packer wheel actuator coupled to the frame and to the packer wheel arm, wherein the packer wheel actuator is configured to control a second downforce applied by the packer wheel to the soil; and
a controller configured to output a first output signal indicative of instructions to control the closing disc actuator and to output a second output signal indicative of instructions to control the packer wheel actuator;
wherein an agricultural product storage compartment is not non-movably coupled to the frame.

10. The row unit of claim 9, wherein the closing disc actuator comprises a first fluid actuator, and the packer wheel actuator comprises a second fluid actuator.

11. The row unit of claim 10, wherein the closing system comprises:
a first valve assembly communicatively coupled to the controller and configured to control fluid pressure within the first fluid actuator; and
a second valve assembly communicatively coupled to the controller and configured to control fluid pressure within the second fluid actuator;
wherein the controller is configured to output the first output signal to the first valve assembly and to output the second output signal to the second valve assembly.

12. The row unit of claim 9, wherein the controller is configured to determine the instructions to control the closing disc actuator based at least in part on a first determined contact force between the closing disc and the soil, the controller is configured to determine the instructions to control the packer wheel actuator based at least in part on a second determined contact force between the packer wheel and the soil, or a combination thereof.

13. The row unit of claim 12, wherein the closing system comprises:
a first downforce sensor communicatively coupled to the controller and configured to output a first input signal indicative of the first determined contact force; and
a second downforce sensor communicatively coupled to the controller and configured to output a second input signal indicative of the second determined contact force.

14. The row unit of claim 9, wherein the controller is configured to determine the instructions to control the closing disc actuator, to determine the instructions to control the packer wheel actuator, or a combination thereof, based at least in part on a measured soil condition.

15. The row unit of claim 14, wherein the closing system comprises a soil sensor communicatively coupled to the controller and configured to output a third input signal indicative of the measured soil condition.

16. A row unit of a seeder comprising:
a first link configured to pivotally coupled to a toolbar of the seeder;
an opener comprising a shank and a blade rigidly coupled to the shank, wherein the shank is pivotally coupled to the first link at a first pivot joint;
a closing system, comprising:
a packer wheel arm pivotally coupled to the first link at the first pivot joint;
a packer wheel rotatably coupled to the packer wheel arm;
a closing disc arm pivotally coupled to the packer wheel arm;
a closing disc rotatably coupled to the closing disc arm, wherein the closing disc arm positions a rotational axis of the closing disc rearward of the blade of the opener relative to a direction of travel of the row unit, and the packer wheel arm positions a rotational axis of the packer wheel rearward of the rotational axis of the closing disc relative to the direction of travel of the row unit; and
a closing disc actuator coupled to the packer wheel arm and to the closing disc arm, wherein the closing disc actuator is configured to control a downforce applied by the closing disc to soil.

17. The row unit of claim 16, comprising a second link configured to pivotally coupled to the toolbar of the seeder, wherein the packer wheel arm is pivotally coupled to the second link at a second pivot joint.

18. The row unit of claim 16, comprising a controller configured to output an output signal indicative of instructions to control the closing disc actuator.

19. The row unit of claim 16, wherein the closing system comprises:
a packer wheel actuator;
wherein the packer wheel arm comprises a first portion pivotally coupled to the first link at the first pivot joint and a second portion pivotally coupled to the first portion, and the packer wheel is rotatably coupled to the second portion; and
wherein the packer wheel actuator is coupled to the first portion and to the second portion of the packer wheel arm, and the packer wheel actuator is configured to control a position of the packer wheel relative to the opener to control a penetration depth of the blade within the soil.

20. The row unit of claim 19, comprising a controller configured to output a first output signal indicative of instructions to control the packer wheel actuator and to output a second output signal indicative of instructions to control the closing disc actuator.

* * * * *